(12) United States Patent
Yabe et al.

(10) Patent No.: US 9,430,623 B2
(45) Date of Patent: Aug. 30, 2016

(54) LICENSE MANAGEMENT SYSTEM, LICENSE MANAGEMENT METHOD, AND CLIENT DEVICE

(71) Applicant: CANON KABUSHIKI KAISHA, Tokyo (JP)

(72) Inventors: Kenta Yabe, Kawasaki (JP); Naoto Yuki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 498 days.

(21) Appl. No.: 13/949,653

(22) Filed: Jul. 24, 2013

(65) Prior Publication Data

US 2014/0047506 A1 Feb. 13, 2014

(30) Foreign Application Priority Data

Aug. 8, 2012 (JP) ................... 2012-176375

(51) Int. Cl.
*G06F 21/10* (2013.01)
(52) U.S. Cl.
CPC ............. *G06F 21/105* (2013.01); *G06F 21/10* (2013.01)
(58) Field of Classification Search
CPC ....................................................... G06F 21/10
See application file for complete search history.

(56) References Cited

U.S. PATENT DOCUMENTS

| 8,713,161 B2* | 4/2014 | Shinomiya | G06F 21/10 709/224 |
| 2009/0038018 A1* | 2/2009 | Mikami | G06F 21/10 726/27 |
| 2011/0067023 A1* | 3/2011 | Chiyo | H04M 1/00222 717/177 |

FOREIGN PATENT DOCUMENTS

JP 2011-118697 A 6/2011

* cited by examiner

*Primary Examiner* — Kambiz Zand
*Assistant Examiner* — Thanh Le
(74) *Attorney, Agent, or Firm* — Fitzpatrick, Cella, Harper & Scinto

(57) ABSTRACT

At the time of license authentication for a PC software product, an inquiry about the license authentication date of an MFP software product included in a combined product is made to an MFP in which the MFP software is installed, and the license authentication date of the earlier date information is deemed as the start date of a maintenance contract. A license management method is provided in which if the PC software product is released within the term of the maintenance contract, the PC software product is made usable.

3 Claims, 25 Drawing Sheets

FIG. 7A

PC SOFTWARE PRODUCT INFORMATION MANAGEMENT TABLE (700)

| PC PRODUCT ID (701) | PC PRODUCT NAME (702) | PC CONTENT ID (703) |
|---|---|---|
| PPID001 | DOCUMENT MANAGEMENT SOFTWARE 1.0 | PCID001 |
| PPID002 | REPORT MANAGEMENT SOFTWARE 1.0 | PCID002 |
| PPID003 | OUTPUT MANAGEMENT SOFTWARE 1.0 | PCID003 |
| PPID004 | DOCUMENT MANAGEMENT SOFTWARE 2.0 | PCID004 |
| PPID005 | REPORT MANAGEMENT SOFTWARE 1.0 | PCID005 |

FIG. 7B

MFP SOFTWARE PRODUCT INFORMATION MANAGEMENT TABLE (704)

| MFP PRODUCT ID (705) | MFP PRODUCT NAME (706) | MFP CONTENT ID (707) |
|---|---|---|
| MPID001 | DOCUMENT MANAGEMENT CLIENT 1.0 | MCID001 |
| MPID002 | REPORT MANAGEMENT CLIENT 1.0 | MCID002 |
| MPID003 | OUTPUT MANAGEMENT CLIENT 1.0 | MCID003 |
| MPID004 | DOCUMENT MANAGEMENT CLIENT 2.0 | MCID004 |

F I G. 7C

COMBINED PRODUCT INFORMATION MANAGEMENT TABLE — 708

| COMBINED PRODUCT ID | COMBINED PRODUCT NAME | MAINTENANCE CONTRACT | MAINTENANCE TERM | RELEASE DATE | INCLUDED PRODUCT ID |
|---|---|---|---|---|---|
| GPID001 | DOCUMENT MANAGEMENT SET 1.0 | true | 365 DAYS | 2012/04/01 | PPID001,MPID001 |
| GPID002 | REPORT MANAGEMENT SET 1.0 | true | 365 DAYS | 2012/06/01 | PPID002,MPID002 |
| GPID003 | OUTPUT MANAGEMENT SET 1.0 | false | | | PPID003,MPID003 |
| GPID004 | DOCUMENT MANAGEMENT SET 2.0 | true | 365 DAYS | 2013/06/01 | PPID004,MPID004 |

FIG. 8A

PC PRODUCT LICENSE INFORMATION MANAGEMENT TABLE (800)

| LICENSE NUMBER (801) | PC PRODUCT ID (802) | LICENSE ISSUE DATE (803) | PC IDENTIFIER (804) |
|---|---|---|---|
| ABCD-1234-EFGH-5678 | PPID001 | 2012/06/10 | PC001 |
| IJKL-9012-MNOP-3456 | PPID001 | | |
| QRST-7890-UVWX-1234 | PPID003 | 2013/03/01 | PC003 |

FIG. 8B

MFP PRODUCT LICENSE INFORMATION MANAGEMENT TABLE (805)

| LICENSE NUMBER (806) | MFP PRODUCT ID (807) | LICENSE ISSUE DATE (808) | MFP SERIAL NUMBER (809) |
|---|---|---|---|
| YZAB-5678-CDEF-9012 | MPID001 | 2012/04/01 | MSNO001 |

FIG. 8C

COMBINED PRODUCT LICENSE
INFORMATION MANAGEMENT TABLE

| COMBINED PRODUCT ID | COMBINED PRODUCT LICENSE NUMBER | PC PRODUCT LICENSE NUMBER | MFP PRODUCT LICENSE NUMBER | MAINTENANCE START DATE | MAINTENANCE END DATE |
|---|---|---|---|---|---|
| GPID001 | RKBD-1294-FYQA-8603 | ABCD-1234-EFGH-5678 | YZAB-5678-CDEF-9012 | 2012/04/01 | 2013/03/31 |

FIG. 9A

PC SOFTWARE INFORMATION MANAGEMENT TABLE 900

| PC CONTENT ID | LICENSE AUTHENTICATION | PC PRODUCT ID | PRODUCT NAME | LICENSE NUMBER | MAINTENANCE START DATE | MAINTENANCE END DATE |
|---|---|---|---|---|---|---|
| PCID001 | UNAUTHENTICATED | | | | | |

PC SOFTWARE INFORMATION MANAGEMENT TABLE 908

| PC CONTENT ID | LICENSE AUTHENTICATION | PC PRODUCT ID | PRODUCT NAME | LICENSE NUMBER | MAINTENANCE START DATE | MAINTENANCE END DATE |
|---|---|---|---|---|---|---|
| PCID001 | AUTHENTICATED | PPID001 | DOCUMENT MANAGEMENT SOFTWARE 1.0 | ABCD-1334-EFGH-5678 | 2013/06/10 | 2013/06/09 |

FIG. 10

| MFP CONTENT ID | LICENSE AUTHENTICATION | MFP PRODUCT ID | MFP SOFTWARE INFORMATION MANAGEMENT TABLE | | |
| --- | --- | --- | --- | --- | --- |
| | | | PRODUCT NAME | LICENSE NUMBER | AUTHENTICATION DATE |
| MCID001 | AUTHENTICATED | MPID001 | DOCUMENT MANAGEMENT CLIENT 1.0 | YZAB-5678-CDEF-9014 | 2014/04/01 |

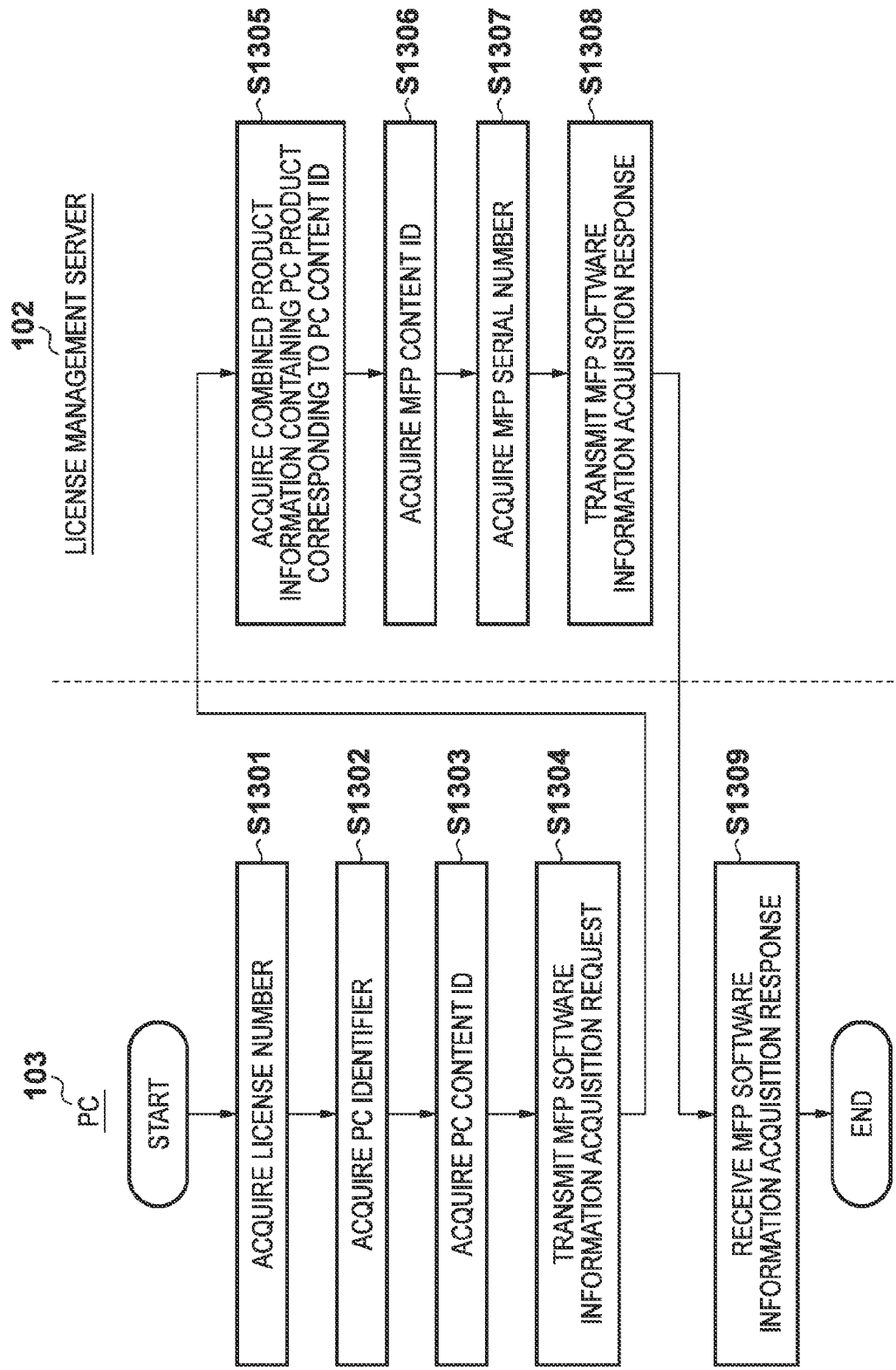

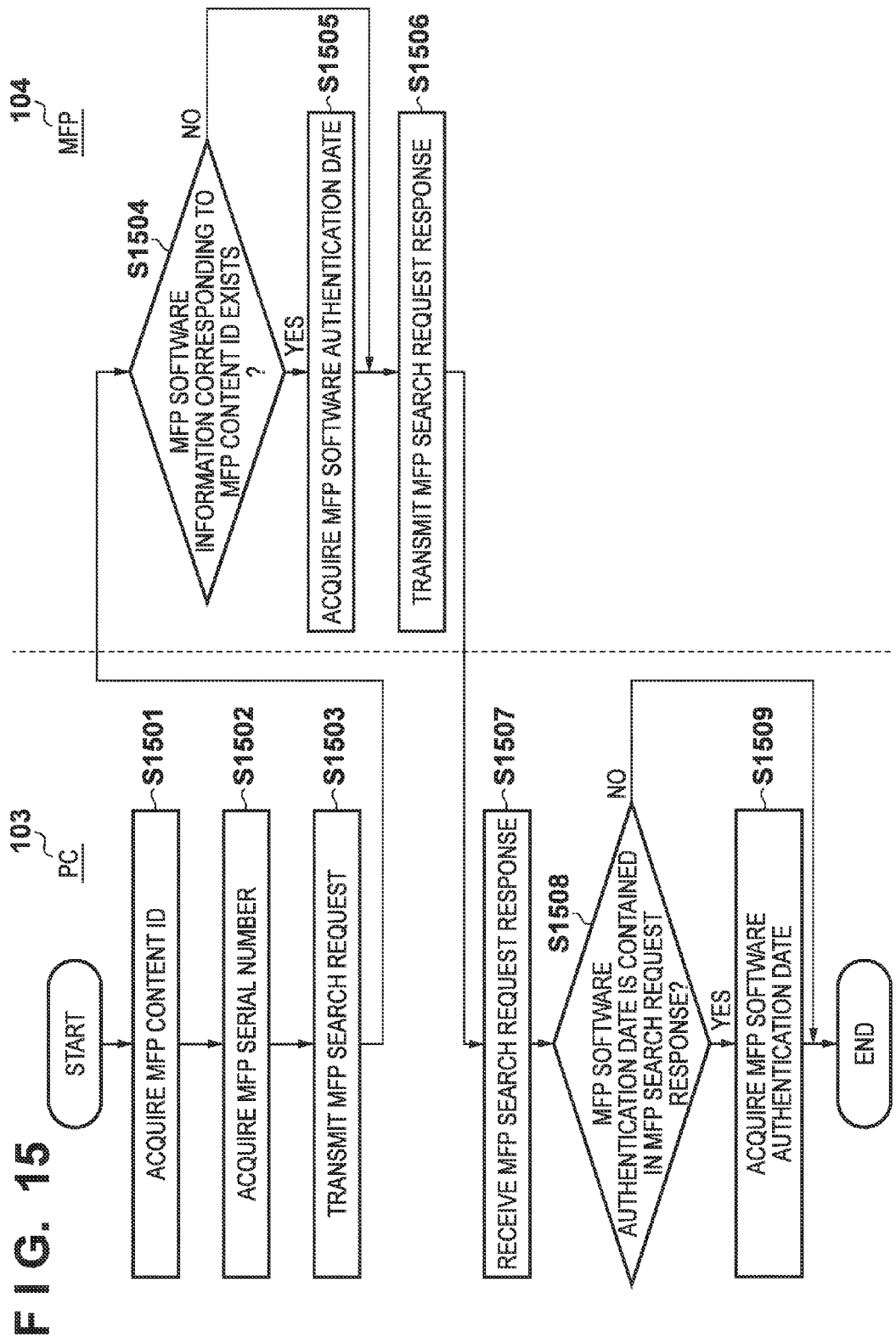

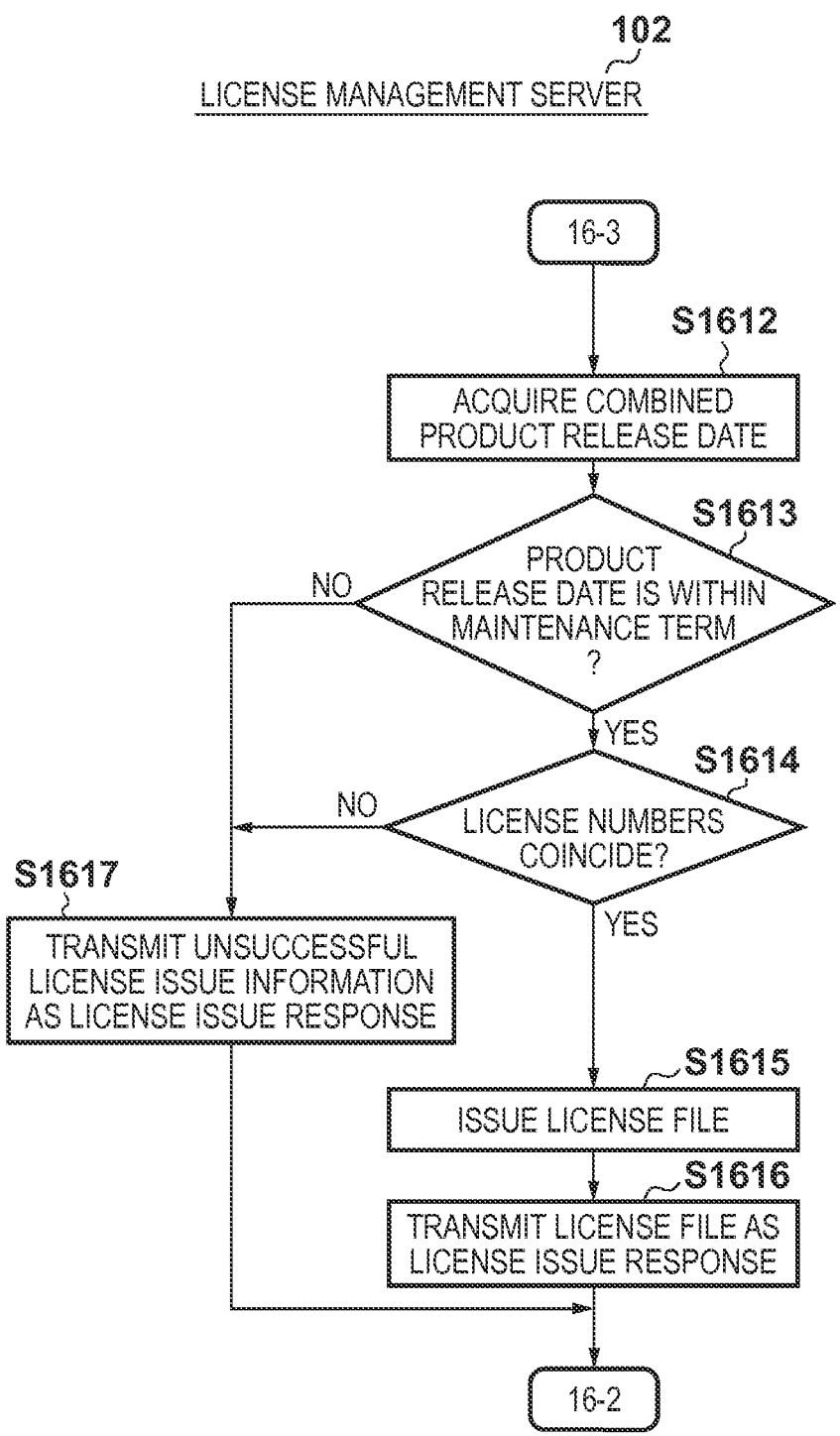

FIG. 17

| | LICENSE ISSUE REQUEST | | |
|---|---|---|---|
| PC CONTENT ID | LICENSE NUMBER | PC IDENTIFIER | MFP SOFTWARE AUTHENTICATION DATE |
| PCID001 | ABCD-1234-EFGH-5678 | PC001 | 2012/04/01 |

FIG. 18A

LICENSE ISSUE RESPONSE (1800)

| PROCESSING RESULT (1801) | LICENSE NUMBER (1802) | PC PRODUCT ID (1803) | PC PRODUCT NAME (1804) | LICENSE (1805) | MAINTENANCE START DATE (1806) | MAINTENANCE END DATE (1807) |
|---|---|---|---|---|---|---|
| Success | ABCD-1234-EFGH-5678 | PPID001 | DOCUMENT MANAGEMENT SOFTWARE 1.0 | wsE3gfasr55343QVz | 2012/04/01 | 2013/03/31 |

FIG. 18B

LICENSE ISSUE RESPONSE (1808)

| PROCESSING RESULT | LICENSE NUMBER | PC PRODUCT ID | PC PRODUCT NAME | LICENSE | MAINTENANCE START DATE | MAINTENANCE END DATE |
|---|---|---|---|---|---|---|
| Failure | | | | | | |

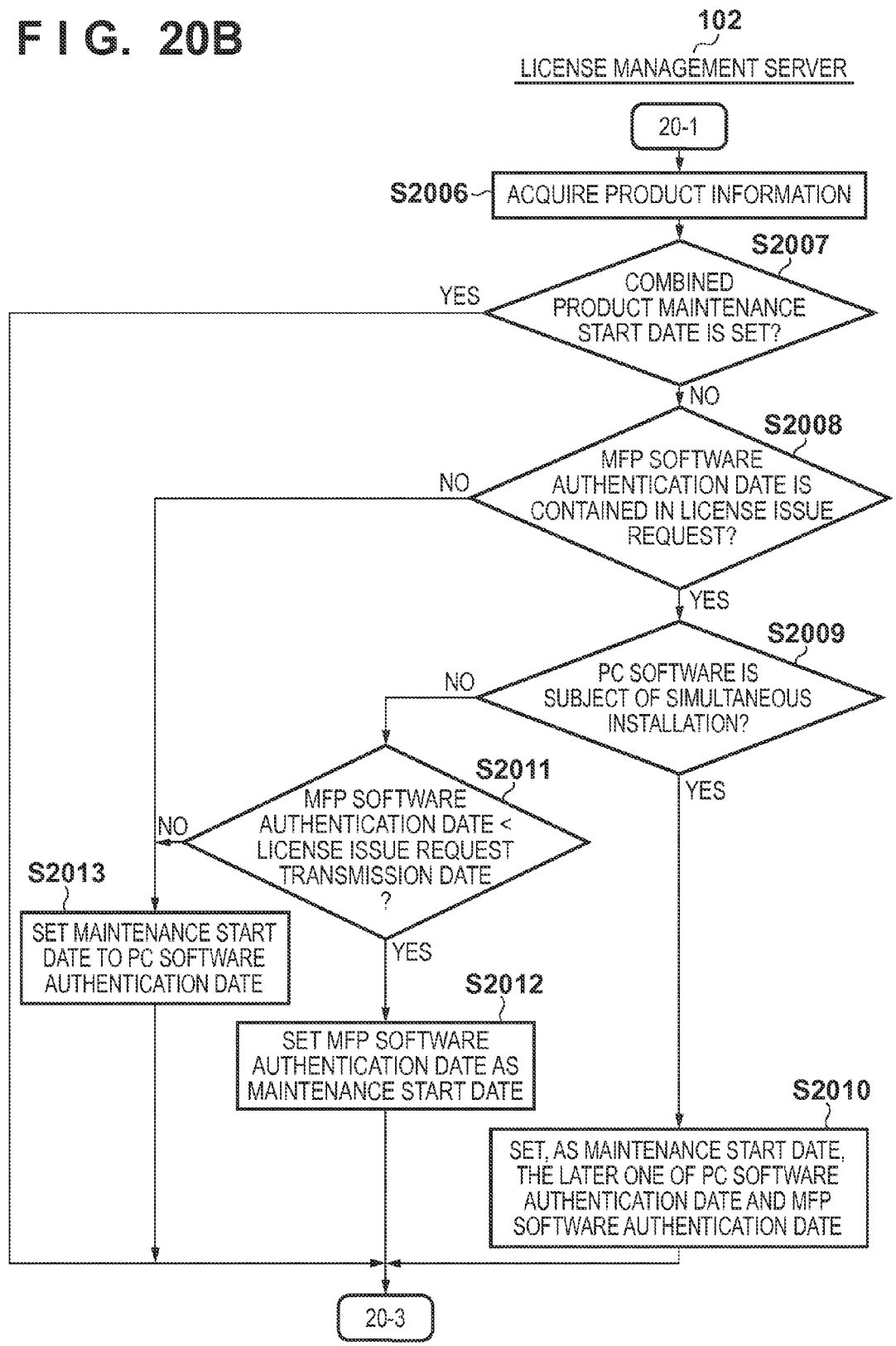

F I G. 21

COMBINED PRODUCT INFORMATION MANAGEMENT TABLE 2100

| COMBINED PRODUCT ID | COMBINED PRODUCT NAME | MAINTENANCE CONTRACT | MAINTENANCE TERM | RELEASE DATE | INCLUDED PRODUCT ID | SIMULTANEOUSLY INSTALLED PRODUCT |
|---|---|---|---|---|---|---|
| GPID001 | DOCUMENT MANAGEMENT SET 1.0 | true | 365 DAYS | 2012/04/01 | PPID001,MPID001 | true |
| GPID002 | REPORT MANAGEMENT SET 1.0 | true | 365 DAYS | 2012/06/01 | PPID002,MPID002 | false |
| GPID003 | OUTPUT MANAGEMENT SET 1.0 | false | | | PPID003,MPID003 | false |
| GPID004 | DOCUMENT MANAGEMENT SET 2.0 | true | 365 DAYS | 2013/06/01 | PPID004,MPID004 | false |

2101 2102 2103 2104 2105 2106 2107

US 9,430,623 B2

LICENSE MANAGEMENT SYSTEM, LICENSE MANAGEMENT METHOD, AND CLIENT DEVICE

BACKGROUND OF THE INVENTION

1. Field of the Invention

The present invention relates to a license management technique, and in particular to a license management system, a license management method, and a client device.

2. Description of the Related Art

Conventionally, license management techniques are used to prevent unauthenticated use of software. The license management techniques include a technique by which entry of a license file is required at the time of installation of software, as with software for a multi-functional peripheral (MFP) (hereinafter referred to as "MFP software"), and the software becomes usable if the entered license file is one distributed along with the software when a user purchased the software.

Also, there is a technique of distributing a license file and allowing use of software only after a user, when installing the software, connects to a license management server and enters a license number, which is for identifying the corresponding license file and is distributed along with the software, as with software for a personal computer (PC) (hereinafter referred to as "PC software").

An upgraded version of software is provided in some cases, for additional features or bug fixing. Upgraded versions may be provided in different forms: for example, one with additional features is provided at a cost, and one for bug fixing is provided for free. In the case of provision at a cost, the license is managed such that a new license file or license number is required for installation of the upgraded version. A user obtains the new license file or license number by additionally purchasing the upgraded version of the software.

In addition to the form in which a user actively obtains an upgraded version of the software every time, currently a form of support is also available in which the upgraded version of the software is provided to a user who contracts a support service, as part of the support service. There is a technique by which, in this case, the software that should be provided is distinguished in accordance with the content of a maintenance contract of the user, and the upgraded version of the software is provided only to the user who has a right to be provided therewith (e.g., see Japanese Patent Laid-Open No. 2011-118697).

However, in the technique described in Japanese Patent Laid-Open No. 2011-118697, a user needs to enter into a maintenance contract as a precondition for acquiring the upgraded version of the software. At this time, the start date and the end date of the maintenance contract are determined independently of the installation of the software. Since the date when the user installs and starts to use the software is not the start date, a problem arises in that the period of time when the user can acquire the upgraded version of the software is shorter than the period of time defined in the maintenance contract.

To acquire a license file, in the case of a PC software product, a user connects to a license management server at the time of installation and enters a license number provided along with the PC software product. In this case, it can be correctly determined that the date when the license file was issued is the date when the PC software product started to be used. However, in the case of MFP software, the license file is provided along with the MFP software, and accordingly, a problem arises in that the license management server cannot recognize the date when the MFP software actually started to be used.

In particular, if PC software and MFP software are provided to a user under a single maintenance contract, the license management server can recognize only the start date of use of the software based on issue of the license of the PC software. In other words, even if the MFP software started to be used prior to the PC software, the start date of the maintenance contract is set to the date when the PC software started to be used. As a result, the user will actually be under the maintenance contract for a longer period than the term of the maintenance contract managed by the license management server.

Then, another problem arises in that, when an upgraded version of the software is provided, a user who is actually not under the maintenance contract can start to use the upgraded version.

SUMMARY OF THE INVENTION

The present invention is for solving the foregoing problems, and provides a license management technique, in particular a license management system, a license management method, and a client device that are capable of appropriately setting the start date of a maintenance contract.

The present invention has the following configuration.

According to a first aspect, the present invention provides a license management system having a client device and a server system that manages a license of a software package including a plurality of pieces of software that are executed on different devices, the client device comprising: a transmission unit that transmits a request containing an identifier of a first piece of software included in the software package to the server system; a first reception unit that receives a response containing device identification information from the server system; a first request unit that makes a request for date information regarding authentication of a second piece of software included in the software package to a device corresponding to the device identification information, if the second piece of software is already authenticated; a second reception unit that receives a response containing the date information regarding authentication from the device corresponding to the device identification information; and a second request unit that makes a request to issue a license of the software package, the request containing the date information regarding authentication, to the server system, the server system comprising: a second transmission unit that, in the case of receiving the request containing the identifier of the first piece of software, transmits device identification information regarding a device that executes the second piece of software to the client device; a third reception unit that receives the request to issue a license for the software package; a setting unit that sets a start date of a maintenance period of the software package, based on the date information regarding authentication contained in the request to issue a license and a date of the request to issue a license; and a response unit that makes a response with the license of the software package to the client device if a date when the software package becomes usable is within the maintenance period starting from the start date.

According to a second aspect, the present invention provides a client device connected to a server system that manages a license of a software package including a plurality of pieces of software that are executed on different devices, comprising: a transmission unit that transmits a request containing an identifier of a first piece of software included in the software package to the server system; a first reception unit that receives, from the server system, a response containing device identification information regarding a device that executes a second piece of software included in the software package; a first request unit that makes a request for date information regarding authentication of the second piece of software to a device corresponding to the device identification information, if the second piece of software is already authenticated; a second reception unit that receives a response containing the date information regarding authentication from the device corresponding to the device identification information; and a second request unit that makes a request to issue a license of the software package, the request containing the date information regarding authentication, to the server system, and a third reception unit that receives the license of the software package from the server system if a date when the software package becomes usable is within a maintenance period starting from a start date of the maintenance period of the software package, the start date being set based on the date information regarding authentication contained in the request to issue a license and a date of the request to issue a license.

According to the present invention, it is possible to correctly manage the start date and the end date of a maintenance contract in association with the start date of use of the software to which the maintenance contract is to apply.

In addition, even if pieces of software to which the maintenance contract is to apply are installed in different devices, as in the case of PC software and MFP software, these pieces of software can be correctly managed in association with the start date of use of the software to which the maintenance contract is to apply.

Also, in addition to this, the burden of management of installation and upgrade of software can be reduced by determining whether or not to issue a license of PC software released within the maintenance contract period.

Further features of the present invention will become apparent from the following description of exemplary embodiments with reference to the attached drawings.

BRIEF DESCRIPTION OF THE DRAWINGS

FIGS. 7A, 7B, and 7C are data structure diagrams of product information.

FIGS. 8A, 8B, and 8C are data structure diagrams of license information.

FIGS. 9A and 9B are data structure diagrams of PC software information.

FIG. 10 is a data structure diagram of MFP software information.

FIG. 13 is a flowchart showing a series of processes for acquiring information on MFP software included in a combined product corresponding to a license number.

FIG. 15 is a flowchart showing a series of processes for acquiring information on the date when license authentication was performed for MFP software.

FIGS. 16A to 16C are flowcharts showing a series of processes for authenticating a license of PC software in a first embodiment.

FIG. 17 is a data structure diagram of a license issue request.

FIGS. 18A and 18B are data structure diagrams of a license issue response.

FIGS. 20A to 20C are flowcharts showing a series of processes for authenticating a license of PC software in a second embodiment.

FIG. 21 is a data structure diagram of combined product information in a second embodiment.

DESCRIPTION OF THE EMBODIMENTS

Hereinafter, an embodiment for carrying out the present invention will be described with reference to the drawings.

First Embodiment

The present embodiment will describe a license management system and a license management method by which, in the case where the subject of a maintenance contract is a combined product (or a complex product) including PC software and MFP software, i.e., a software package or a suite of software, an authentication date of the MFP software is acquired from an MFP when license authentication is performed for the PC software, and if the MFP software product has been installed previously, the installation date thereof is regarded as the start date of the maintenance contract period to appropriately manage the maintenance contract.

In the present embodiment, it is assumed that the PC software product and the MFP software product that are included in the combined product are pieces of software that are able to operate independently from each other.

System Hardware Configuration

Figure 1:
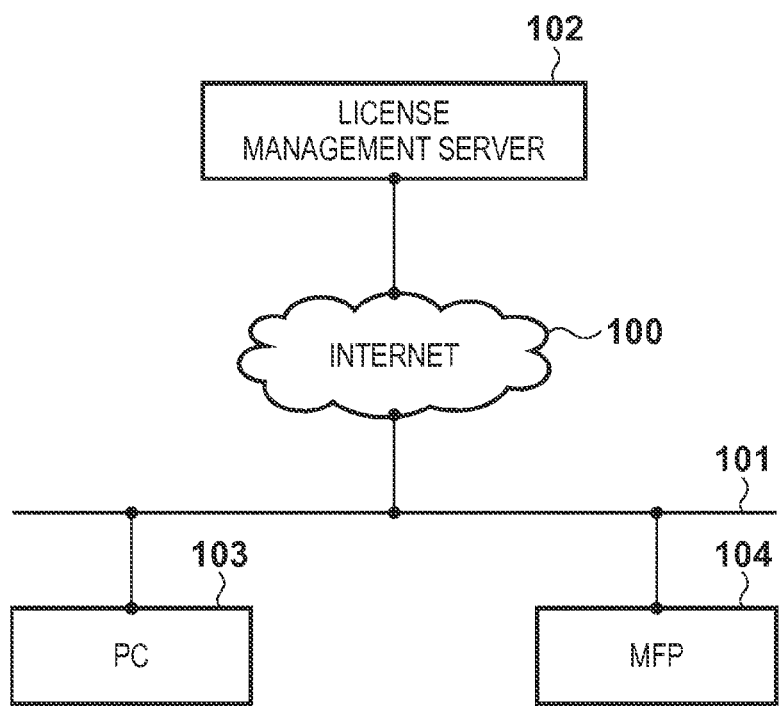
FIG. 1 is a system configuration diagram.

FIG. 1 is a block diagram showing an overall system configuration according to the present embodiment. The Internet 100 is a network that connects a license management server 102, a PC (formally, "personal computer"; hereinafter abbreviated as "PC") 103, and an MFP (formally, "multi-functional peripheral; hereinafter abbreviated as "MFP") 104 to each other, among constituent elements shown in the block diagram in FIG. 1. The MFP is also referred to as a digital multi-function printer or a multi-functional device. Note that although FIG. 1 shows an example where one PC and one MFP are connected to one license management server, the number of PCs and MFPs may be arbitrarily determined to be one or more.

A LAN (formally, "local area network"; hereinafter abbreviated as "LAN") 101 connects the PC 103 and the MFP 104 to each other, among the constituent components shown in the block diagram in FIG. 1. Note that although FIG. 1 shows an example where one PC is connected to one MFP, the number of PCs and MFPs may be arbitrarily determined to be one or more.

The license management server 102 is an Internet application server that issues a license file for PC software and MFP software. The PC 103 is an information processing apparatus, such as a personal computer. The PC 103 communicates with the MFP 104 via the LAN 101. Also, the PC 103 communicates with the license management server 102 via the Internet 100. The MFP 104 is an MFP that serves as an image forming apparatus having a scanner function, a copy function, a print function, a communication function, and the like. The MFP 104 communicates with the PC 103 via the LAN 101. Also, the MFP 104 communicates with the license management server 102 via the Internet 100.

Figure 2:
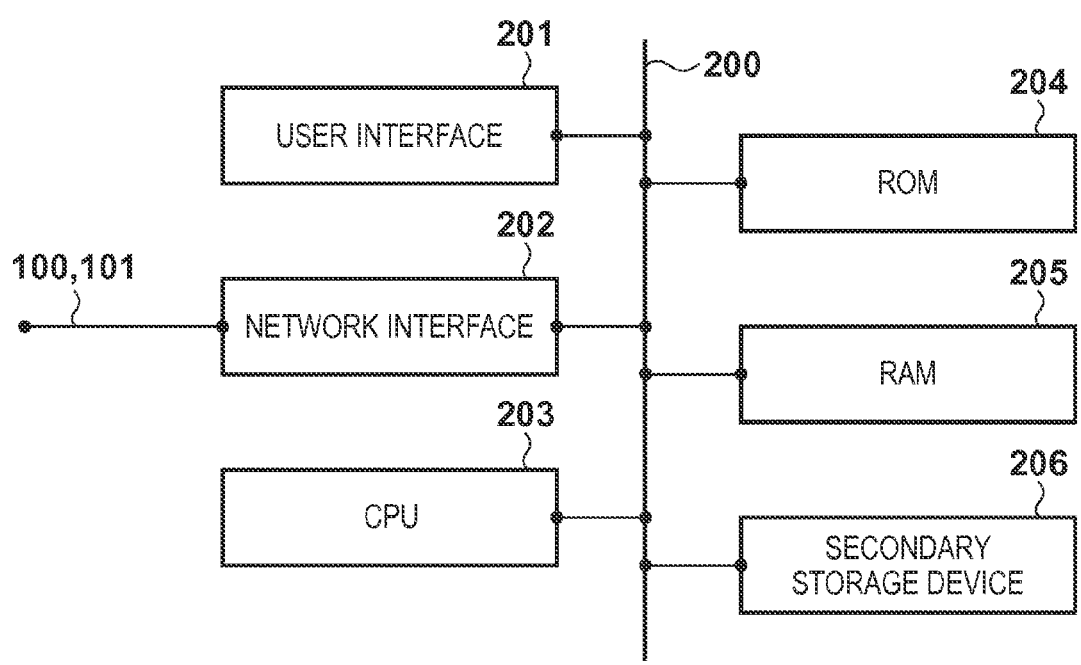
FIG. 2 is a hardware configuration diagram of a license management server 102 and a PC 103.

FIG. 2 is a block diagram showing a hardware configuration of computers of the license management server 102 and the PC 103 that operates as a client device, which are shown in FIG. 1. Note that the license management server 102 may be realized by a server system constituted by a plurality of servers. A system bus 200 is a bus for mutually connecting components that constitute the information processing apparatus. A user interface 201 is hardware for inputting and outputting information with a display, a keyboard, a mouse, and the like. If the computer does not have these kinds of hardware, it can also be connected and operated from other computers using remote desktop software or the like. A network interface 202 is hardware that is connected to networks such as the Internet 100 and the LAN 101 and communicates with other computers and network devices. A CPU 203 executes a program that is read from a ROM 204, a RAM 205, or a secondary storage device 206 to realize each function. It directly or indirectly controls the constituent components connected by the system bus 200. The ROM 204 is a read-only storage device, and data and embedded programs such as a BIOS are recorded in the ROM 204. The RAM 205 is a temporary memory area used as a work area for operation of the CPU 203. The secondary storage device 206 is an external storage device as typified by an HDD, in which an OS, or an operating system, and other software modules are stored.

Figure 3:
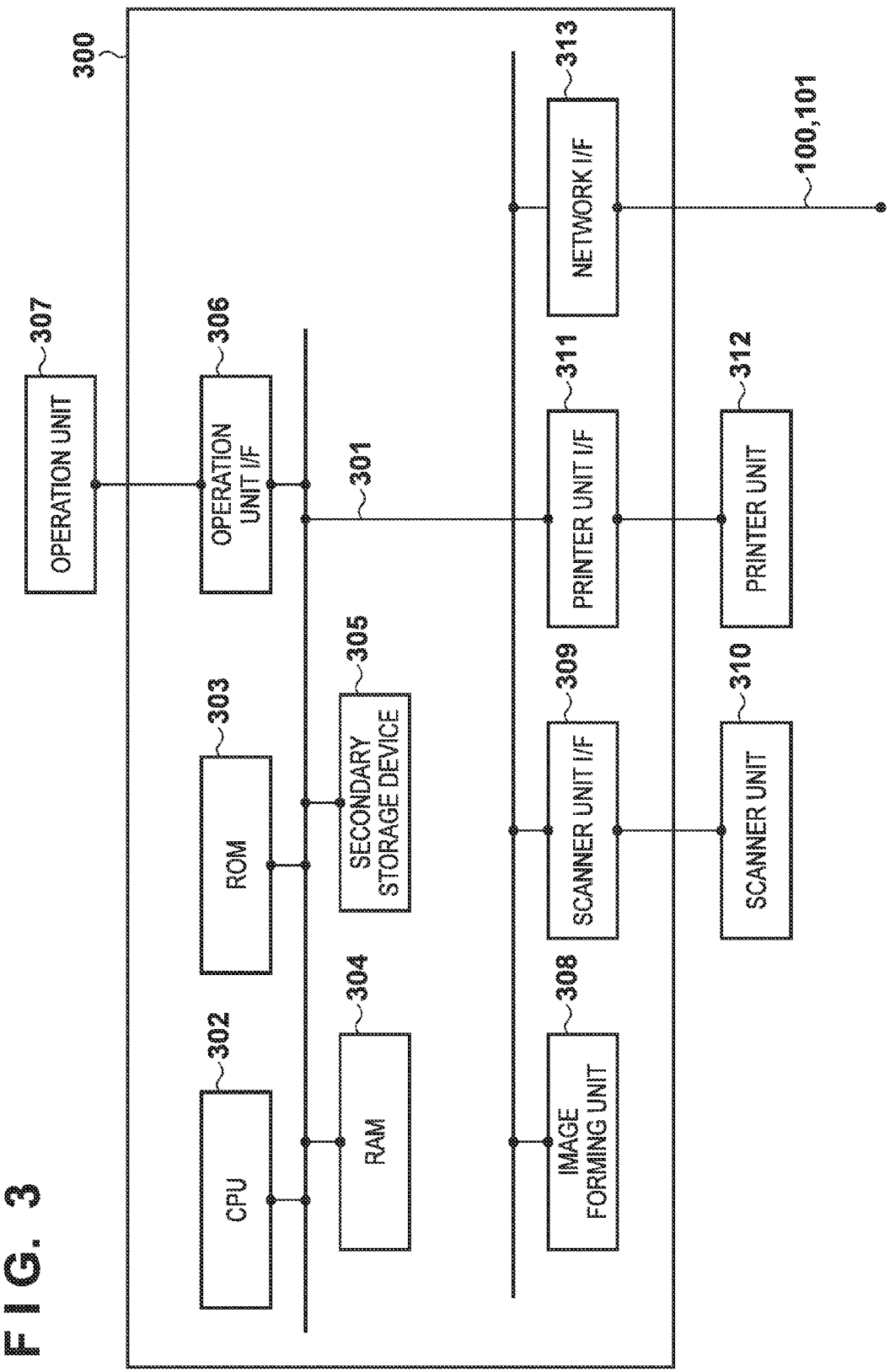
FIG. 3 is a hardware configuration diagram of an MFP 104.

FIG. 3 is a block diagram showing a hardware configuration of the MFP 104 shown in FIG. 1. A controller 300 is electrically connected to an operation unit 307, a scanner unit 310, and a printer unit 312. Meanwhile, it is also connected to the Internet 100 and the LAN 101 via the network interface 313. Thus, communication according to a communication protocol such as TCP/IP is possible. A system bus 301 is a bus for mutually connecting constituent components of the controller 300. The CPU 302 comprehensively controls, via the LAN 101, the access to connected PCs and MFPs and the access from other devices, based on control programs or the like stored in a ROM 303. Also, it directly or indirectly controls the constituent components of the controller 300 that are connected by the system bus 301. Control performed by the CPU 302 includes execution of a program for realizing flowcharts of the present invention, which will be described later. The ROM 303 is a read-only storage device in which a boot program for the device is stored. A RAM 304 is a primary storage device that is used as a work area for operation of the CPU 302, and used to temporarily store image data. Also, the RAM 304 is used as a temporal memory for reading software modules for realizing the present invention. The secondary storage device 305 is an auxiliary storage device that is capable of storing system software and image data.

An operation unit I/F 306 is an interface unit for connecting the system bus 301 and an operation unit 307. The operation unit I/F 306 receives image data to be displayed on the operation unit 307 from the system bus 301, outputs it to the operation unit 307, and outputs information that is input from the operation unit 307 to the system bus 301. The operation unit 307 is an input/output device including a touch-panel display and the like. It has a function of displaying information to a user who uses the MFP 104 and a function of accepting an input from the user. An image forming unit 308 performs processing such as direction change, image compression, expansion, and the like on image data. Also, it is able to compose different pieces of image data stored in the secondary storage device 305 to form a single image. A scanner unit I/F 309 corrects, processes, and edits image data received from the scanner unit 310. The scanner unit 310 is an image input device that reads an image of an original that is put on an original reading stage (not shown) of the MFP 104, and forms image data. A printer unit I/F 311 receives image data sent from the image forming unit 308, and performs image formation with the image data, referring to attribute data that accompanies the image data. The image data after image formation is output to the printer unit 312. The printer unit 312 is an image output device that forms a print image on paper, using the image data received from the controller 300 via the printer unit I/F 311. The network I/F 313 is connected to the Internet 100, the LAN 101, and the system bus 301 to input and output information.

Software Configuration of License Management Server

Figure 4:
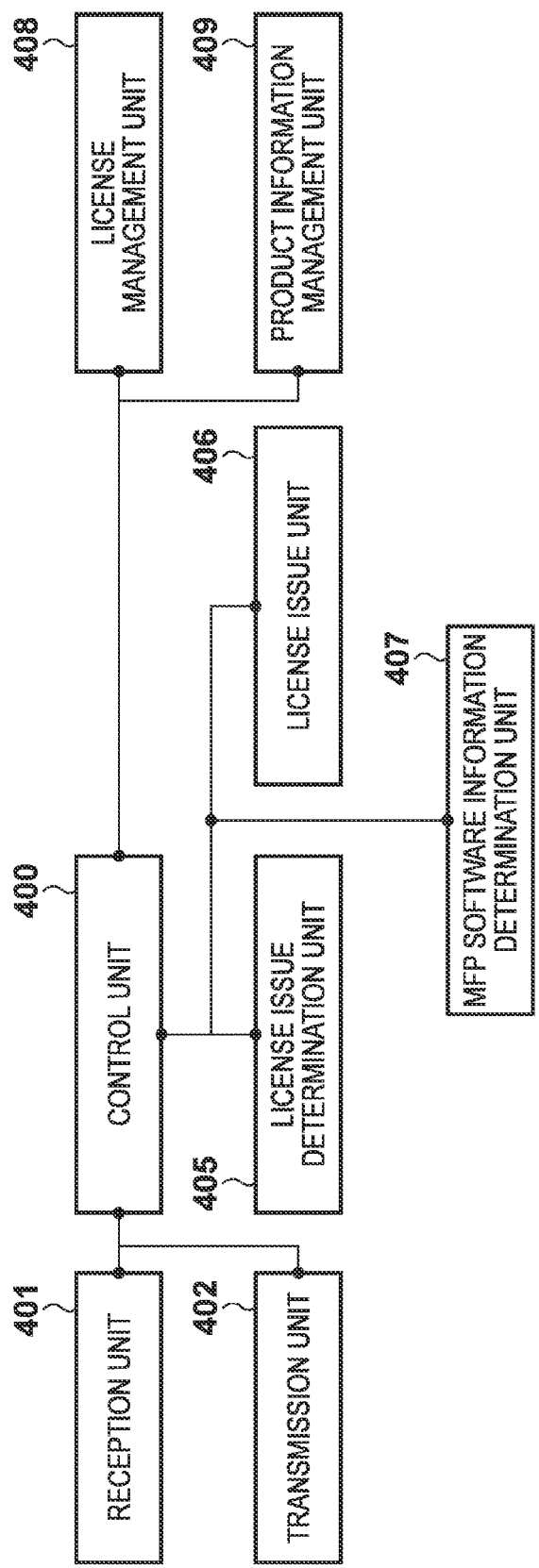
FIG. 4 is a software configuration diagram of the license management server 102.

FIG. 4 is a block diagram showing a configuration of software modules of the license management server 102 for license management of the present embodiment. These software modules are stored in the secondary storage device 206 in the license management server 102 and executed by the CPU 203.

A control unit 400 controls the overall license management server 102, and manages and gives instructions to constituent components of the software modules. A reception unit 401 performs processing for receiving a request to issue a license from the PC 103 that is connected via the Internet 100. Also, it performs processing for receiving a request for software information from the PC 103 that is connected via the Internet 100. A transmission unit 402 transmits a license file to the PC 103 that is connected via the Internet. Also, it transmits software information to the PC 103 that is connected via the Internet 100.

A license issue determination unit 405 determines, in accordance with an instruction of the control unit 400, whether or not the license issue request received by the reception unit 401 is proper for issue of the corresponding license file. For determination regarding the license issue request, it acquires appropriate information from a license management unit 408, a product information management unit 409, and a group information management unit 410, and executes license issue determination processing. The license issue determination processing executed by the license issue determination unit 405 will be described later. The result of the license issue determination processing is delivered to the control unit 400.

The license issue unit 406 issues a license file in accordance with an instruction of the control unit 400 if the result of the determination processing by the license issue determination unit 405 is affirmative.

An MFP software information determination unit 407 acquires MFP software information corresponding to the software information request received by the reception unit 401, from the product information management unit 409.

The license management unit 408 manages license information stored in the secondary storage device 206, in accordance with an instruction of the control unit 400. The license information is information constituted by a management table 800 for PC software license information, a management table 805 for MFP software license information, and a management table 810 for combined product license information, which will be described later.

The product information management unit 409 manages product information stored in the secondary storage device 206, in accordance with an instruction of the control unit 400. The product information is information constituted by PC software product information, MFP software product information, and combined product information in which these pieces of information are combined. The respective pieces of product information are managed in a management table 700 for the PC software product information, a management table 704 for the MFP software product information, and a management table 708 for the combined product information.

PC Software Configuration

Figure 5:
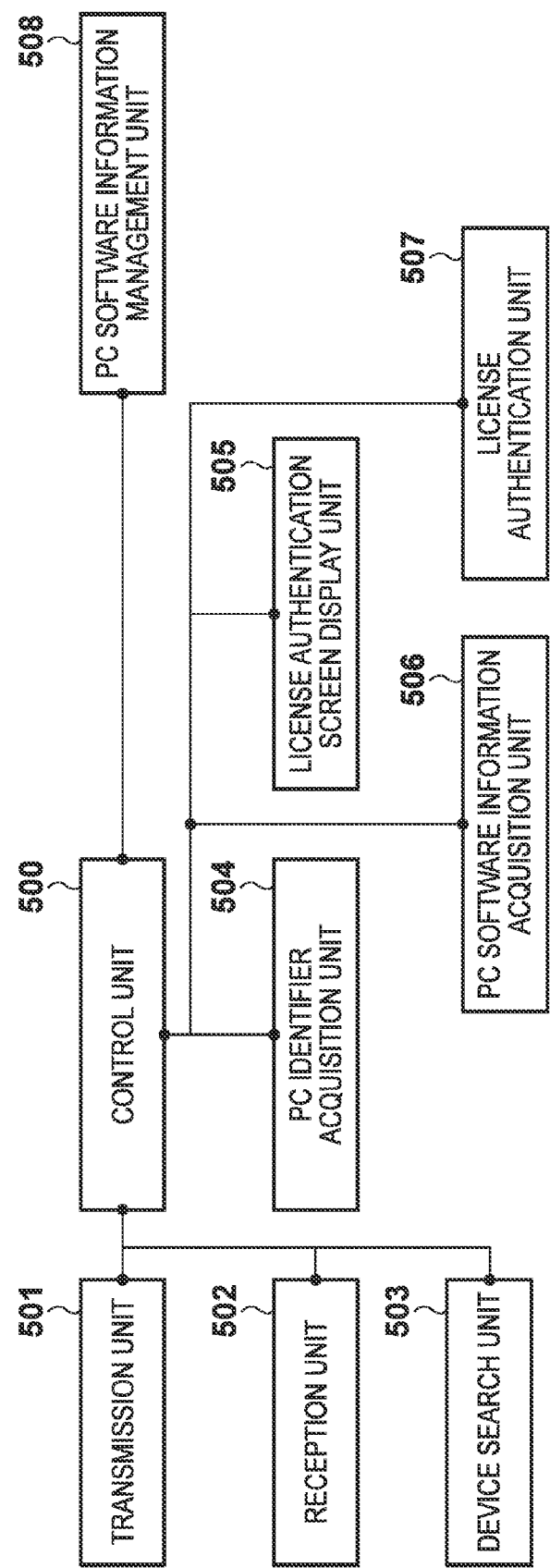
FIG. 5 is a software configuration diagram of PC software to be installed in the PC 103.

FIG. 5 is a block diagram showing a configuration of software modules that are installed in the PC 103 for license management of the present embodiment. These software modules are stored in the secondary storage device 206 in the PC 103 and executed by the CPU 203.

A control unit 500 controls the entire software installed in the PC 103, and manages, and gives instructions to, constituent elements of the software modules.

A transmission unit 501 transmits a license issue request to the license management server 102 that is connected via the Internet 100. Also, it transmits an MFP software information acquisition request to the license management server 102 that is connected via the Internet 100. The license issue request is generated by the transmission unit 501 in step S1605 in FIG. 16A, which will be described later. The data structure of the license issue request will be described later with reference to FIG. 17. Also, the MFP software information acquisition request is constituted by a PC identifier that is acquired by a PC identifier acquisition unit 506 in accordance with an instruction of the control unit 500, and a PC content ID that is acquired by a PC software information acquisition unit 508. The data structure of the MFP software information acquisition request will be described later with reference to FIG. 14A.

The reception unit 502 performs processing for receiving a license file from the license management server 102 that is connected via the Internet 100. Also, it performs processing for receiving MFP software information from the license management server 102 that is connected via the Internet 100.

A device search unit 503 transmits a device search request to check whether specified MFP software has been installed, to a specific MFP 104 that is connected via the LAN 101.

A PC identifier acquisition unit 504 acquires an identifier for uniquely identifying the PC 103, from the PC 103. The PC identifier may be any kind of information regarding a unique value: for example, it may be a value generated by the PC 103 in UUID (formally, "universally unique identifier"; hereinafter abbreviated as "UUID") format. It may also be an identifier generated by each piece of hardware that constitute the PC 103, or may be a combination thereof.

A license authentication screen display unit 505 displays a license number entry screen 1200, which will be described later, on the user interface 201 (e.g., a display) of the PC 103.

A PC software information acquisition unit 506 acquires information that uniquely identifies the PC software to be installed in the PC 103. The PC software information is information managed by the PC software information management unit 508, and is arbitrary information generated by the license management server 102.

A license authentication unit 507 processes the license file received from the license management server 102 that is connected via the Internet 100, and makes the corresponding PC software usable on the PC 103.

The PC software information management unit 508 manages information that uniquely identifies PC software to be installed in the PC 103. The managed PC software information is constituted by a PC software information management table 900.

MFP Software Configuration

Figure 6:
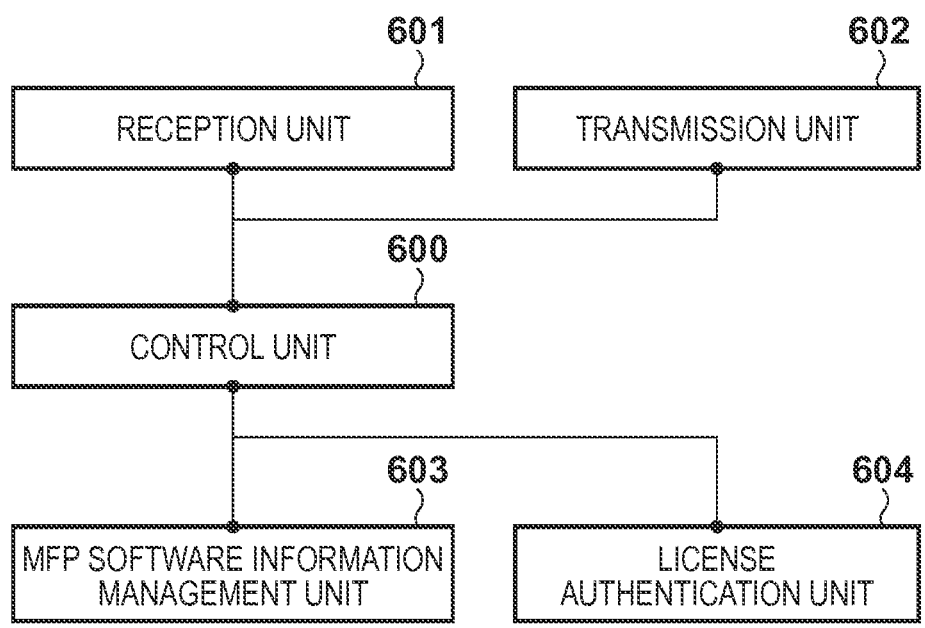
FIG. 6 is a software configuration diagram of an MFP 104.

FIG. 6 is a block diagram showing a configuration of software modules of the MFP 104 for license management of the present invention. These software modules are stored in the secondary storage device 305 in the MFP 104 and executed by the CPU 302.

A control unit 600 controls the overall MFP 104, and manages, and gives instructions to, constituent components of the software modules.

A reception unit 601 performs processing for receiving a device search request from the PC 103 that is connected via the LAN 101. For the received device search request, it is checked whether or not license information corresponding to a value of an MFP content ID column contained in the device search request is managed by an MFP software information management unit 603, in accordance with an instruction of the control unit 600. The device information, which is the result of the check, is transmitted by the transmission unit 602 to the PC 103 that is connected via the LAN 101.

The MFP software information management unit 603 manages information that uniquely identifies MFP software to be installed in the MFP 104. The managed MFP software information is constituted by an MFP software information table 1000.

A license authentication unit 604 processes a license file issued by the license management server 102 and makes the corresponding MFP software usable in the MFP 104.

Configuration of Information Management Tables

FIGS. 7A, 7B, and 7C are diagrams showing data structures of the software product information managed by the product information management unit 409 in the license management server 102, in the form of tables. There are three types of product information managed by the product information management unit 409, namely information on PC software products, information on MFP software products, and information on combined products, and the management tables of FIGS. 7A, 7B, and 7C correspond thereto, respectively. The product information is management information for each product type. A PC software product information management table 700 in FIG. 7A is a table for managing PC software product information. The PC software product information management table 700 includes records for the respective products, and each record is constituted by a PC product ID column 701, a PC product name column 702, and a PC content ID column 703. When PC software product information is registered in the license management server 102, a record corresponding to the registered product is added to the PC software product information management table 700. Upon registration of this information, the corresponding PC software is ready to be provided to the user.

The PC product ID column 701 is a column for storing a PC product ID for uniquely identifying a PC software product. The PC product name column 702 is a column for storing the product name of a PC software product. The product name of the PC software product is displayed in a product name display label 1604 within a license number entry screen 1200 in FIG. 12, which will be described later. The PC content ID column 703 is a column for storing a PC content ID, which is an identifier for uniquely identifying commercialized PC software. The PC product ID does not necessarily correspond to the PC content ID. For example, multiple different PC product IDs may possibly be assigned to one type of program, for the purpose of product management or the like. A PC content ID is uniquely assigned to one program. Accordingly, they are associated with each other by the software product information management table. Therefore, the PC product ID is used as a software identifier for maintenance and management or the like, while the PC content ID can be used as a software identifier in a program execution environment.

The MFP software product information management table 704 in FIG. 7B is a table for managing MFP software product information. The MFP software product information management table 704 includes records for the respective products, and each record is constituted by an MFP product ID column 705, an MFP product name column 706, and an MFP content ID column 707. When MFP software product information is registered in the license management server 102, a record corresponding to the registered product is added to the MFP software product information management table 704. Upon registration of this information, the corresponding MFP software is ready to be provided to the user.

The MFP product ID column 705 is a column for storing an MFP product ID for uniquely identifying an MFP software product. The MFP product name column 706 is a column for storing the product name of the MFP software product. The MFP content ID column 707 is a column for storing an MFP content ID, which is an identifier for uniquely identifying the MFP software product.

A combined product information management table 708 in FIG. 7C is a table for managing combined product information. A combined product is a form of product in which one or more PC software products and one or more MFP software products are combined and provided as one product to users.

The combined product information management table 708 includes records for the respective products, and each record is constituted by a combined product ID column 709, a combined product name column 710, a maintenance contract column 711, a maintenance period column 712, a release date column 713, and an included product ID column 714. When combined product information is registered in the license management server 102, a record corresponding to the registered product is added to the combined product information management table 708.

The combined product ID column 709 is a column for storing a combined product ID for uniquely identifying a combined product. The combined product name column 710 is a column for storing the product name of the combined product. The maintenance contract column 711 is a column for storing information indicating whether or not the combined product is provided under a maintenance contract. A value of "true" is stored if the combined product is provided under a maintenance contract, and a value of "false" is stored if it is not provided under a maintenance contract. If the value of the maintenance contract column 711 is "true", values are stored in the maintenance period column 712 and the release date column 713. If the value of the maintenance contract column 711 is "false", values are not stored in the maintenance period column 712 or the release date column 713. The present embodiment describes license management of a combined product for which the value of the maintenance contract column 711 is "true".

The maintenance period column 712 is a column for storing a maintenance period of the combined product for which the value of the maintenance contract column 711 is "true". The release date column 713 is a column for storing information regarding the date when the combined product actually becomes usable to the user. "Date when the combined product becomes usable" can also be called, in other words, the date when the user is allowed to start use of the combined product. The date and the time are contained in the date information in the case where the time is also managed, but if the license is managed in units of days, the information need only contain the date. If the current date is prior to the date of the information stored in the release date column, the license management server 102 does not issue a license even if it received the later-described license issue request. The included product ID column 714 is a column for storing a PC product ID and an MFP product ID of the PC software product and the MFP software product that are provided as the combined product.

FIGS. 8A, 8B, and 8C are diagrams showing data structures of license information on a software product managed by the license management unit 408 in the license management server 102, in the form of tables. There are three types of license information managed by the license management unit 408, namely information on a PC software product, information on an MFP software product, and information on a combined product, and the management tables of FIGS. 8A, 8B, and 8C correspond thereto, respectively. The license information is information used for the purpose of license management, and therefore is management information regarding individual licenses. The license information containing the license number and the license issue date is created when the license management server 102 issues the license number, and is registered in the corresponding tables in accordance with the type of the license information (PC, MFP, complex).

A PC product license information management table 800 in FIG. 8A is a table for managing PC software product license information. The PC product license information management table 800 includes records for the respective licenses, and each record is constituted by a license number column 801, a PC product ID column 802, a license issue date column 803, and a PC identifier column 804. Each piece of data of the PC product license information management table 800 is added to the PC product license information management table 800 in association with an issued license number when the license management server 102 issues the license number of the corresponding PC software product.

The license number column 801 is a column for storing the license number issued when a PC software product is provided to a user. The PC product ID column 802 is a column for storing a PC product ID that becomes usable with the license number. At the point in time when the license number is issued, only the license number and the PC product ID are added to the PC product license information management table 800. When the license management server 102 receives the later-described license issue request and issues a license file, corresponding values are stored in the license issue date column 803 and the PC identifier column 804.

The license issue date column 803 is a column for storing the date when the license management server 102 received the license issue request of the corresponding license number from the PC 103 and issued the license file. The PC identifier column 804 is a column for storing a PC identifier for uniquely identifying the PC 103 for which the license file was issued.

An MFP product license information management table 805 in FIG. 8B is a table for managing license information on an MFP software product. The MFP product license information management table 805 includes records for the respective licenses, and each record is constituted by a license number column 806, an MFP product ID column 807, a license issue date column 808, and an MFP serial number column 809. Each piece of data of the MFP product license information management table 805 is added to the MFP product license information management table 805 in association with an issued license number when the license management server 102 issues the license number of the corresponding MFP software product.

The license number column 806 is a column for storing the license number issued when an MFP software product is provided to a user. The MFP product ID column 807 is a column for storing an MFP software product ID that becomes usable with the license number. At the point in time when the license number is issued, only the license number and the MFP software product ID are added to the MFP product license information management table 805. When the license management server 102 receives the later-described license issue request and issues a license file, corresponding values are stored in the license issue date column 808 and the MFP serial number column 809.

The license issue date column 808 is a column for storing the date when the license management server 102 received the license issue request of the corresponding license number from the PC 103 and issued the license file. The MFP serial number column 809 is a column for storing the serial number for uniquely identifying the MFP 104 that executes the MFP software.

A combined product license information management table 810 in FIG. 8C is a table for managing license information on a combined product. The combined product license information management table 810 includes records for the respective licenses, and each record is constituted by a combined product ID column 811, a combined product license number column 812, a PC product license number column 813, an MFP product license number column 814, a maintenance start date column 815, and a maintenance end date column 816.

Each piece of data of the combined product license information management table 810 is added to the combined product license information management table 810 in association with an issued license number when the license management server 102 issues the license number of the corresponding combined product.

The combined product ID column 811 is a column for storing a combined product ID for uniquely identifying a combined product. The combined product license number column 812 is a column for storing the license number issued when the combined product is provided to a user. The PC product license number column 813 is a column for storing the license number corresponding to the PC software product stored in the included product ID column 714 of the combined product information management table 708. The MFP product license number column 814 is a column for storing the license number corresponding to the MFP software product stored in the included product ID column 714 of the combined product information management table 708. The maintenance start date column 815 is a column for storing the maintenance start date in the case where the corresponding combined product is provided under a maintenance contract. The maintenance end date column 816 is a column for storing the maintenance end date in the case where the corresponding combined product is provided under a maintenance contract. The maintenance start date column 815 and the maintenance end date column 816 do not store any values in the case where the corresponding combined product is not provided under a maintenance contract.

For a combined product, when the license management server 102 issues the license number of the combined product, the license numbers of the PC software product and the MFP software product stored in the included product ID column 714 of the combined product information management table 708 are automatically issued. The issued license numbers of the PC software and the MFP software are stored in the combined product license information management table in association with the license number of the combined product. In response to issue of the license numbers of the PC software and the MFP software, records are also added individually to the PC software license management table 800 and the MFP software license management table 805. When the combined product is provided to the user, only the license number stored in the combined product license number column 812 is provided.

FIGS. 9A and 9B are diagrams showing data structures of the information on the PC software installed in the PC 103 that is managed by the PC software information management unit 510, in the form of tables. FIG. 9A shows a state where the license is unauthenticated, and FIG. 9B shows a state where the license is authenticated. PC software information management tables 900 and 908 shown in FIGS. 9A and 9B include records for the respective pieces of software, and each record is constituted by a PC content ID column 901, a license authentication column 902, a PC product ID column 903, a product name column 904, a license number column 905, a maintenance start date column 906, and a maintenance end date column 907.

The PC software information management table 900 is an example showing the state when the PC software subjected to management is provided in the PC 103 for the first time. "To be provided" means that software is downloaded or installed, for example. In the present embodiment, a program cannot be executed when it is only installed, and it can be executed only after license authentication is performed, and accordingly, the program cannot be executed merely by being "provided". The PC software information management table 908 is an example showing a state where the PC software is usable after the license file issued by the license management server 102 is processed by the license authentication unit 509. The PC software information management table 900 is stored in the secondary storage device 206 when the PC software is provided in the PC 103 for the first time.

The PC content ID column 901 is a column for storing a PC content ID, which is an identifier for uniquely identifying PC software. The license authentication column 902 is a column for storing a value that indicates whether or not license authentication for the PC software has been performed. If the license authentication unit 509 has processed the license file issued by the license management server 102, a value of "authenticated" is stored. If the license file has not been processed, that is, when a record is added, a value of "unauthenticated" is stored. If the value of "authenticated" is stored in the license authentication column 902, values for the license file are also stored in the columns 903 to 907. The values for the license file will be described later.

The PC product ID column 903 is a column for storing a PC product ID for uniquely identifying the PC software product. The product name column 904 is a column for storing the product name of the PC software product. The license number column 905 is a column for storing the license number corresponding to the PC software product. The maintenance start date column 906 is a column for storing the maintenance start date of the PC software product. The maintenance end date column 907 is a column for storing the maintenance end date of the PC software product. Values of the maintenance start date column 906 and the maintenance end date column 907 are stored when the value of the maintenance contract column 711 is "true".

FIG. 10 is a diagram showing a data structure of the information on the MFP software installed in the MFP 104 that is managed by the MFP software information management unit 603, in the form of a table. An MFP software information management table 1000 includes records for the respective pieces of software, and each record is constituted by an MFP content ID column 1001, a license authentication column 1002, an MFP product ID column 1003, a product name column 1004, a license number column 1005, and an authentication date column 1006. The MFP software information management table 1000 is stored in the secondary storage device 305 when the MFP software is disposed in an MFP together with a license file issued by the license management server 102.

The MFP content ID column 1001 is a column for storing an MFP content ID, which is an identifier for uniquely identifying the MFP software. The license authentication column 1002 is a column for storing a value that indicates whether or not license authentication for the PC software has been performed. If the license authentication unit 604 has processed the license file issued by the license management server 102, a value of "authenticated" is stored. If the license file has not been processed, a value of "unauthenticated" is stored. When license authentication is performed, a value of "authenticated" is stored in the license authentication column 1002, and values for the license file are also stored in the columns 1003 to 1006. The values for the license file will be described later.

The MFP product ID column 1003 is a column for storing an MFP product ID for uniquely identifying the MFP software product. The product name column 1004 is a column for storing the product name of the MFP software product. The license number column 1005 is a column for storing the license number corresponding to the MFP software product. The authentication date column 1006 stores information regarding the date when the license management unit 604 processed the license file issued by the license management server 102.

Procedure for Executing PC Software

Figure 11:
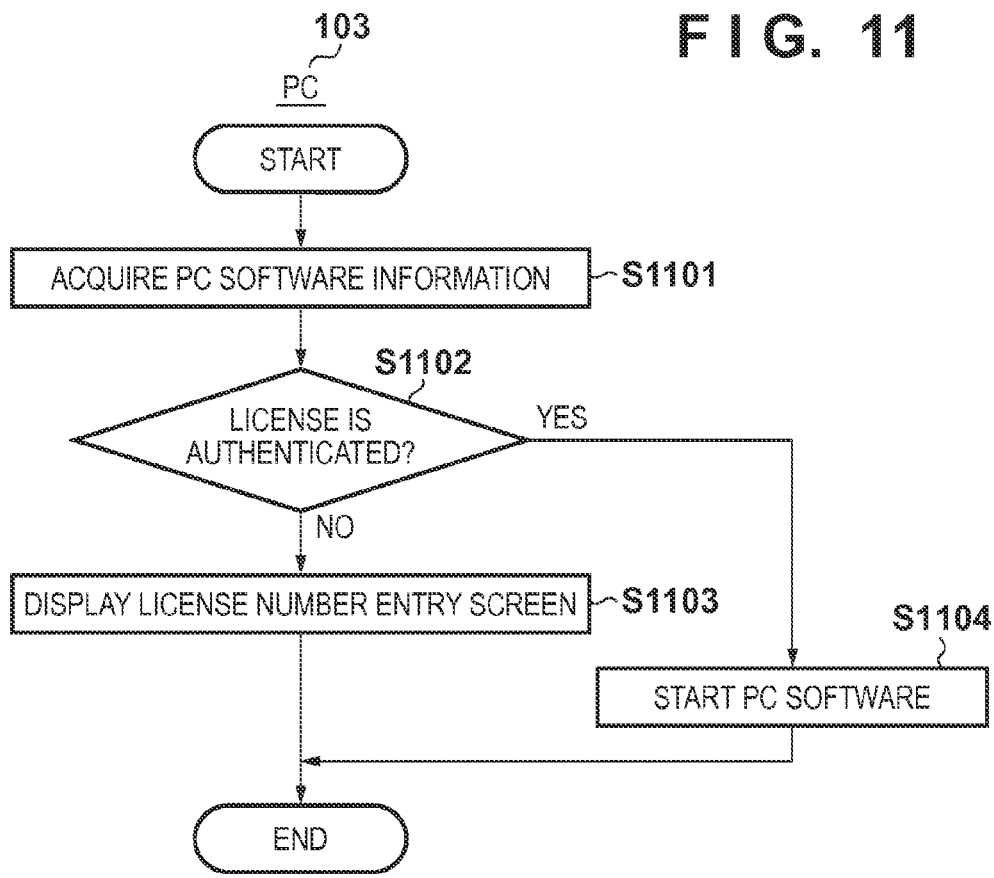
FIG. 11 is a flowchart showing a series of processes for executing PC software.

FIG. 11 is a flowchart showing a series of operations for executing PC software that is stored in the secondary storage device 206 in the PC 103 and subjected to the license management according to the present embodiment, in accordance with an instruction from a user. The flowchart shown in FIG. 11 is executed on the CPU 203 in the PC 103.

In step S1101, the PC software information acquisition unit 508 receives specification of the PC software with a PC content ID or the like and a request to execute the specified PC software, in accordance with a user operation on the user interface 201 or the like. Then, it acquires, from the PC software information management unit 510, PC software information corresponding to the PC software execution request from the user, specifically PC software information corresponding to the PC content ID of the program for which execution is requested. That is to say, it acquires records in the PC software information management table 900 or 908 corresponding to the PC content ID of the program to be executed.

In step S1102, the PC software information acquisition unit 508 refers to the value of the license authentication column 902 for the acquired PC software information. If the value of the license authentication column 902 is "authenticated", processing proceeds to step S1104. If the value of the license authentication column 902 is "unauthenticated", processing proceeds to step S1103.

In step S1103, the license authentication screen display unit 507 displays the license number entry screen 1200 on the user interface 201, such as a display (not shown) or the like of the PC 103.

Figure 12:
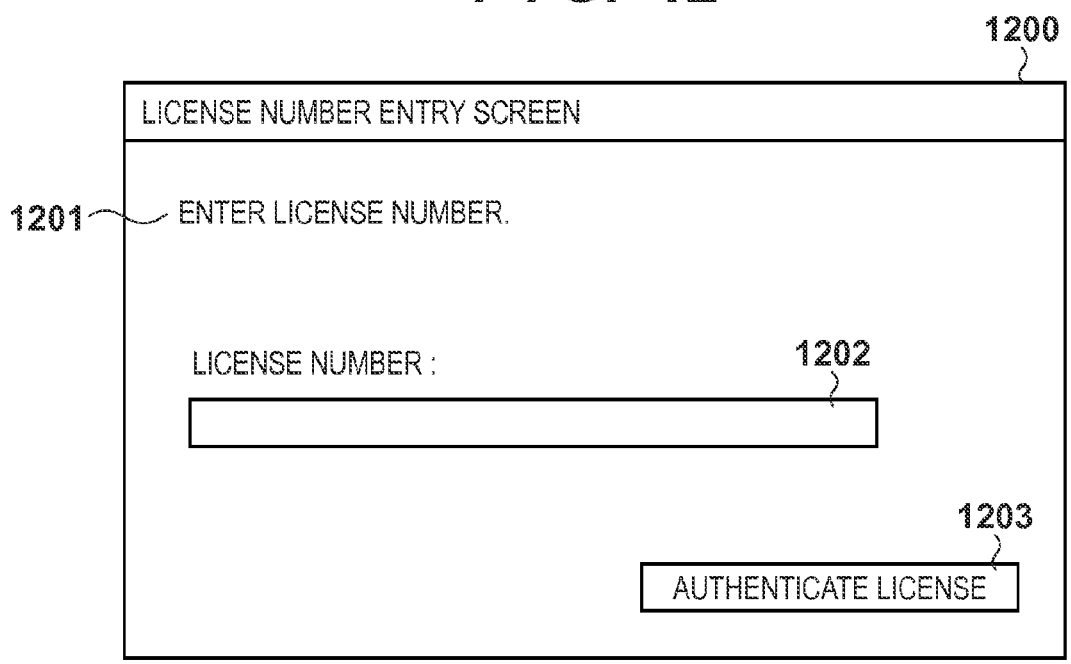
FIG. 12 is a diagram showing a license number entry screen.

FIG. 12 is a diagram showing the license number entry screen displayed by the license authentication screen display unit 507 in step S1103. The license number entry screen 1200 is constituted by a screen content display label 1201, a license number entry form 1202, and a license authentication button 1203. The screen content display label 1201 displays a message that prompts the user to enter the license number.

The license number entry form 1202 is a text form in which the user enters the license number.

The license authentication button 1203 is a button by which the user transmits the license issue request containing the license number entered in the license number entry form 1202 to the license management server 102. Upon the button being pressed by the user, processing proceeds to step S1301 in FIG. 17.

In step S1104, the CPU 203 starts the PC software of which execution is requested.

Acquisition of Software Information from MFP

FIG. 13 is a flowchart showing a series of operations for acquiring, from the license management server 102, information on the MFP software included in the combined product that includes the PC software corresponding to the license number entered by the user in step S1103. The flowchart shown in FIG. 13 is executed on the CPU 203 in the PC 103 and on the CPU 203 in the license management server 102. Note that for PC software and MFP software that are not provided as a combined product, a procedure may be performed in which, for example, the entered license number is authenticated by the license management server 102, and then the license file is issued for the corresponding software.

In step S1301, the license authentication screen display unit 507 acquires the license number entered in the license number entry form 1202 in the license number entry screen 1200. The license number is given by the license management server 102 to the software to be executed, and for the PC software and the MFP software, the issued license numbers thereof are entered. For a combined product, although the license numbers of both the PC software and the MFP software are also issued, the license number of the combined product is entered here.

In step S1302, the PC identifier acquisition unit 506 acquires the PC identifier of the PC 103.

In step S1303, the PC software information acquisition unit 508 acquires the value of the PC content ID column 901 in the PC software information acquired from the PC software information management unit 510 in step S1101.

In step S1304, the transmission unit 501 generates the MFP software information acquisition request using the PC identifier acquired in step S1302 and the value of the PC content ID column 901 acquired in step S1303.

Figure 14A:
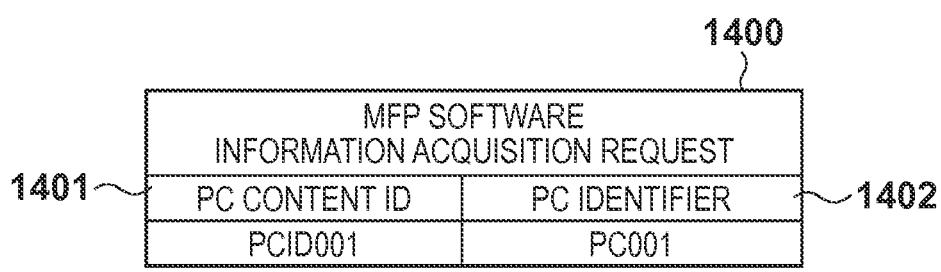
FIGS. 14A and 14B are data structure diagrams of an MFP software information acquisition request and response.

FIG. 14A is a diagram showing the data structure of the MFP software information acquisition request generated by the transmission unit 501 in step S1304, in the form of a table. An MFP software information acquisition request 1400 is constituted by a PC content ID column 1401 and a PC identifier column 1402. The PC content ID column 1401 stores the value of the PC content ID column 901 acquired by the PC software information acquisition unit 508 in step S1303. The PC identifier column 1402 stores the value of the PC identifier acquired by the PC identifier acquisition unit 506 in step S1302.

In step S1304 in FIG. 13, the transmission unit 501 further transmits the generated MFP software information acquisition request 1400 to the license management server 102 via the Internet 100.

Steps S1305 to S1308 are executed by the license management server 102. In step S1305, the reception unit 401 in the license management server 102 receives the MFP software information acquisition request 1400 transmitted from the PC 103. The reception unit 401 acquires the value of the PC content ID column 1401 in the MFP software information acquisition request 1400, and acquires the information on the combined product including the PC software product corresponding to this value, from the product information management unit 409.

Specifically, first, the MFP software information determination unit 407 acquires the PC product ID of the PC software product corresponding to the PC content ID acquired via the reception unit 401, from the PC product ID column 701 of the PC software product information management table 700.

Next, the MFP software information determination unit 407 acquires the combined product information that includes the value of the acquired PC product ID column in the included product ID column 714 of the combined product information management table 708.

In step S1306, the MFP software information determination unit 407 reads the value of the included product ID column 714 contained in the combined product information acquired in step S1305, particularly the MFP product ID contained therein. Then, the MFP software information determination unit 407 acquires the value of the MFP content ID column 707 corresponding to the MFP product ID 705 contained in the included product ID column 714, from the MFP software product information management table 704 via the product information management unit 409.

In step S1307, the MFP software information determination unit 407 acquires the MFP software product information corresponding to the MFP content ID acquired in step S1306, from the MFP software product information management table 704 via the license management unit 408. Then, it acquires the MFP software license information corresponding to the MFP software ID contained in the acquired MFP software product information, from the MFP software product license information management table 805. The MFP software information determination unit 407 then acquires the value of the MFP serial number column 809 contained in the acquired MFP product license information.

In step S1308, the transmission unit 402 generates an MFP software information acquisition response 1403 based on the MFP content ID acquired in step S1306 and the MFP serial number acquired in step S1307.

Figure 14B:
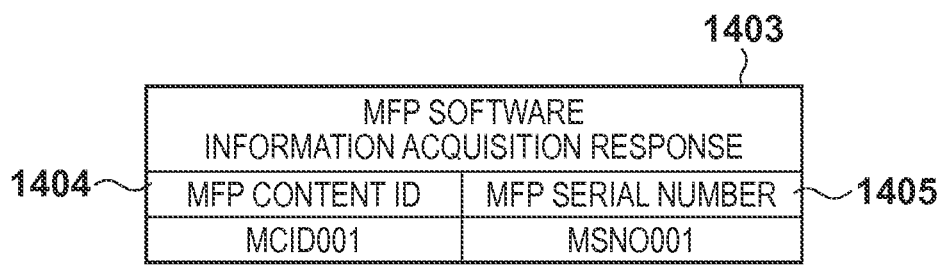

FIG. 14B is a diagram showing the data structure of the MFP software information acquisition response generated by the transmission unit 402 in step S1308, in the form of a table. The MFP software information acquisition response 1403 is constituted by an MFP content ID column 1404 and an MFP serial number column 1405. In step S1306, the MFP content ID column 1404 stores the value of the MFP content ID column 803 acquired by the MFP software information determination unit 407. The MFP serial number column 1405 stores the value of the MFP serial number column 809 in the MFP product license information acquired by the MFP software information determination unit 407 in step S1307. If a plurality of MFP serial numbers are acquired in step S1307, all of them are stored. If there is no corresponding MFP software, both columns are left empty, and if the corresponding MFP software is found but the license thereof has not been issued, the MFP serial number column 1405 is left empty.

In step S1308, the transmission unit 402 further transmits the generated MFP software information acquisition response 1403 to the license management server 102 via the Internet 100.

In step S1309, the reception unit 502 in the PC 103 receives the MFP software information acquisition response 1403 transmitted from the license management server 102. The received response includes the MFP serial number and the like as device identification information on the device (MFP) that executes the MFP software included in the combined product that is the subject of the license.

Acquisition of MFP Software Authentication Date from MFP

FIG. 15 is a flowchart showing a series of operations for searching for the MFP in which the MFP software is installed, based on the MFP software information acquisition response 1403 received by the PC 102 in step S1309, and acquiring information regarding the actual date when the license authentication for the MFP software was performed. The flowchart shown in FIG. 15 is executed on the CPU 203 in the PC 103 and on the CPU 302 in the MFP 104.

In step S1501, the reception unit 502 acquires the value of the MFP content ID from the MFP content ID column 1404 in the MFP software information acquisition response 1403 received in step S1309.

In step S1502, the reception unit 502 acquires the value of the MFP serial number from the MFP serial number column 1405 in the MFP software information acquisition response 1403 received in step S1309.

In step S1503, the device search unit 503 transmits an MFP search request to check whether or not the MFP software corresponding to the MFP content ID acquired in step S1501 is authenticated for use in one or more MFPs connected via the LAN 101. The MFP search request contains the MFP content ID acquired in step S1501 and the MFP serial number acquired in step S1502.

In step S1504, the reception unit 601 in the MFP receives the MFP search request transmitted from the device search unit 503 in the PC 102 in step S1503. First, the reception unit 601 in the MFP checks whether or not the MFP serial number contained in the received MFP search request coincides with the serial number of this MFP. If the serial numbers coincide, the reception unit 601 acquires the MFP content ID. Then, the reception unit 601 checks, via the license information management unit 603, whether or not the MFP software information corresponding to the acquired MFP content ID exists in the MFP software information management table 1000. If the corresponding MFP software information exists in the MFP software information management table 1000, processing proceeds to step S1505. If no corresponding MFP software information exists in the MFP software information management table 1000, processing proceeds to step S1506.

In step S1505, the reception unit 601 acquires the value of the authentication date column 1006 contained in the MFP software information corresponding to the MFP content ID acquired in step S1504. If the MFP software is authenticated, that is, if the license of the MFP software has been issued and processed and the MFP software is executable, the authentication date is already registered. If not, the MFP software is unauthenticated, then the authentication date column 1006 is empty, and an empty value is acquired in this case.

In step S1506, the transmission unit 602 transmits an MFP search request response to the PC 103 via the LAN 101. If the value of the authentication date column 1006 in the MFP software information is acquired in step S1505, this value is transmitted. If no corresponding MFP software information exists in the MFP software information management table 1000 in step S1504, empty information indicating that no MFP software corresponding to the MFP content ID exists is returned to the MFP 104. In this case, the authentication date is also left empty.

In step S1507, the device search unit 503 receives the MFP search request response from the MFP 104 that is connected via the LAN 101.

In step S1508, the device search unit 503 determines whether or not the authentication date of the MFP software corresponding to the MFP content ID acquired in step S1501 exists in the MFP search request response received in step S1507. If the authentication date of the MFP software exists, in step S1509 the device search unit 503 acquires the authentication date of the MFP software. At this time, if a plurality of authentication dates of the MFP software exist in the MFP search request response, the oldest authentication date among them is acquired.

License Authentication Procedure

Figure 16A:
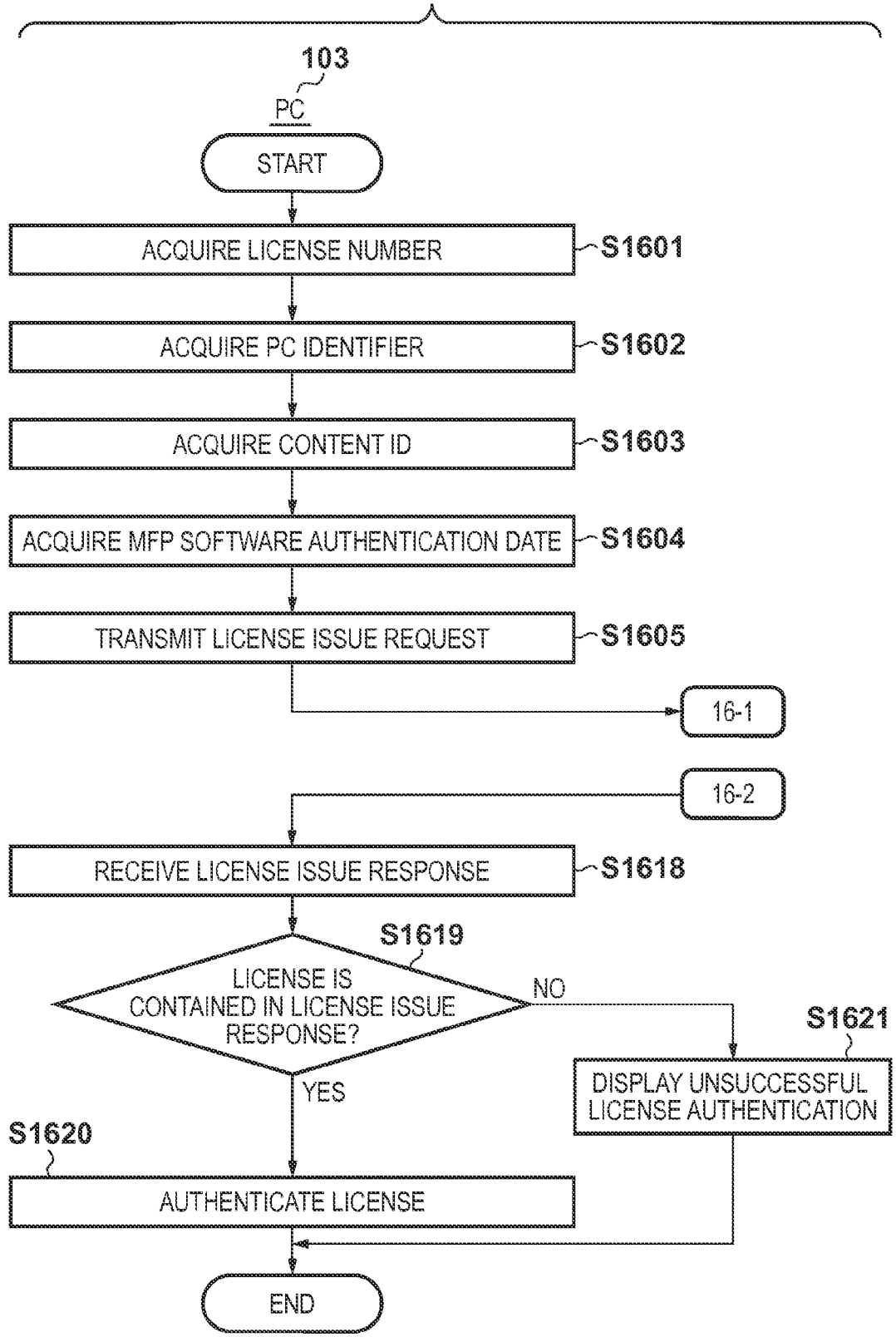
Figure 16B:
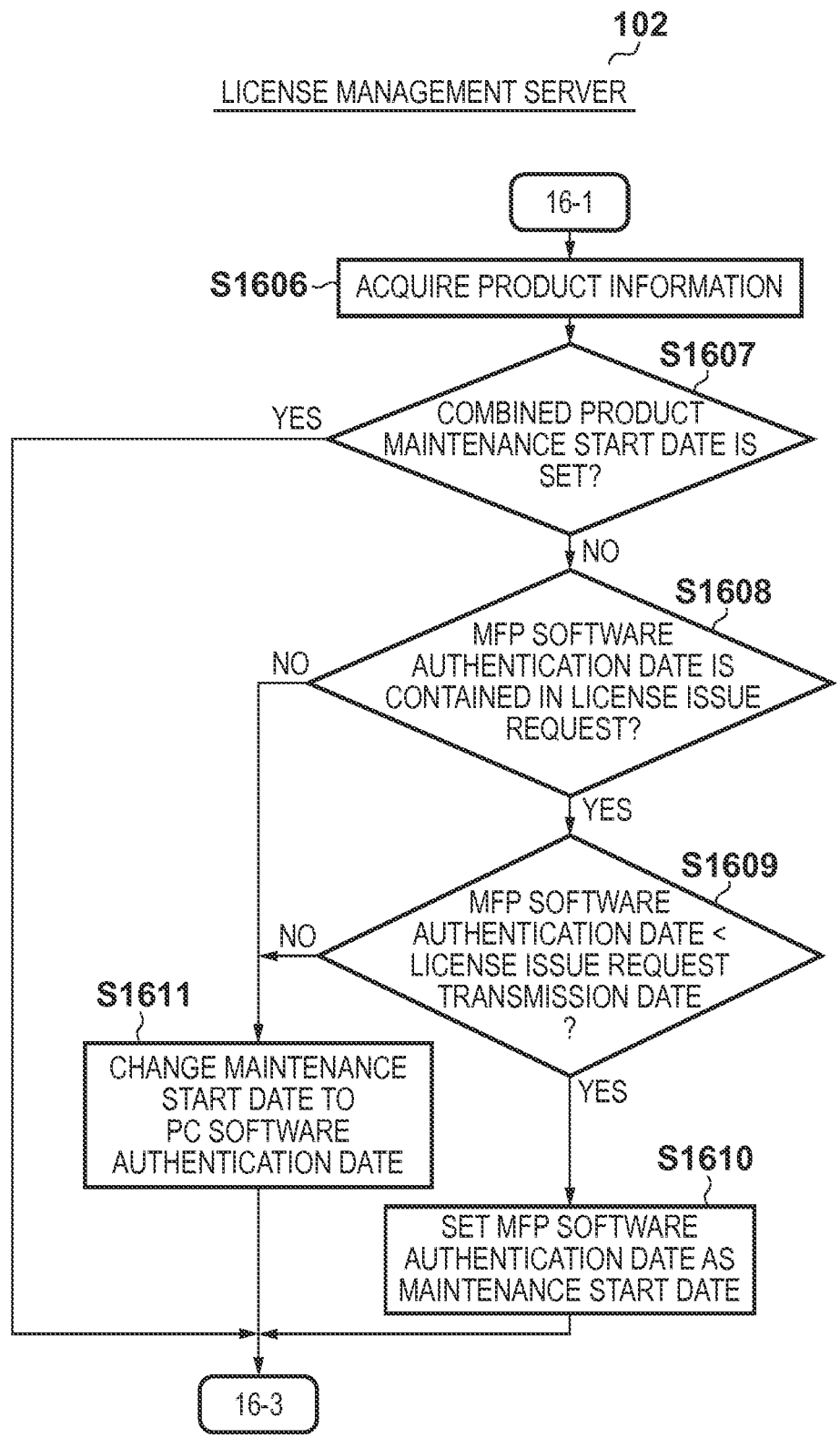

FIGS. 16A-16C are flowcharts showing a series of operations for authenticating the license of the PC software that is stored in the secondary storage device 206 in the PC 103 started in step S1101 and that is subjected to the license management according to the present invention. This procedure is executed subsequently to FIG. 13.

In step S1601, the transmission unit 501 acquires the license number that has already been entered in step S1301. In step S1602, the transmission unit 501 acquires the PC identifier of the PC 103 via the PC identifier acquisition unit 506.

In step S1603, the transmission unit 501 acquires the value of the PC content ID column 901 in the PC software information acquired from the PC software information management unit 510 in step S1101, via the PC software information acquisition unit 508. Of course the PC content ID, which has already been acquired, need only be read out, and there is no need to acquire it again. In step S1604, the transmission unit 501 acquires the authentication date of the MFP software acquired in step S1509. Of course the authentication date, which has already been acquired, need only be read out, and there is no need to acquire it again.

In step S1605, the transmission unit 501 generates a license issue request 1700.

FIG. 17 is a diagram showing a data structure of the license issue request generated by the transmission unit 501 in step S1605 in the form of a table. The license issue request 1700 includes a PC content ID column 1701, a license number column 1702, a PC identifier column 1703, and an MFP software authentication date column 1704. The PC content ID column 1701 stores the value of the PC content ID acquired in step S1603 (i.e., acquired in step S1101). The license number column 1702 stores the value of the license number acquired in step S1601 (i.e., acquired in step S1301). The PC identifier column 1703 stores the value of the PC identifier acquired in step S1602. The MFP software authentication date column 1704 stores the value of the authentication date of the MFP software acquired in step S1604 (i.e., acquired in step S1509).

In step S1605, the transmission unit 501 further transmits the generated license issue request 1700 to the license management server 102 via the Internet 100.

In step S1606 in FIG. 16B, the reception unit 401 in the license management server 102 receives the license issue request from the PC 103. Then, the license issue request reception unit 501 delivers the received license issue request to the license issue determination unit 405. The license issue determination unit 405 first acquires the value of the PC content ID column 1701 in the license issue request. Then, the license issue determination unit 405 acquires, via the product information management unit 409, the PC software product information that coincides with the value of the PC content ID column 703 in the PC software product information management table 700. Next, the license issue determination unit 405 acquires the combined product information having the included product ID column 714 with the PC product ID stored in the PC product ID column 701 in the acquired PC software product information, from the combined product information management table 708 via the product information management unit 409.

In step S1607, the license issue determination unit 405 acquires the combined product license information that coincides with the value of the combined product ID column 709 in the combined product information acquired in step S1606, from the combined product license information management table 810 via the license management unit 408. Then, the license issue determination unit 405 checks the value of the maintenance start date column 815 in the acquired combined product license information. If no value is stored in the maintenance start date column 815, processing proceeds to step S1608. If a value is stored therein, processing proceeds to step S1612 in FIG. 16C.

In step S1608, the license issue determination unit 405 checks the value of the MFP software authentication date column 1704 in the license issue request received in step S1606. If a value is stored in the MFP software authentication date column 1704, processing proceeds to step S1609. If no value is stored therein, processing proceeds to step S1611.

In step S1609, the license issue determination unit 405 compares the date when the MFP software stored in the MFP software authentication date column 1704 was authenticated with the date when the license issue request for the PC software was transmitted from the PC 103 in step S1605. If the MFP software included in the combined product was authenticated prior to the date when the license issue request for the PC software included in the same combined product was transmitted, processing proceeds to step S1610. If not, processing proceeds to step S1611.

In step S1610, the license issue determination unit 405 stores the value of the MFP software authentication date column 1704 in the license issue request, in the maintenance start date column 815 in the combined product license information. Also, the license issue determination unit 405 stores, in the maintenance end date column 816, the value of the maintenance end date that reflects the number of days stored in the maintenance period column 712 in the combined product information acquired in step S1606.

In step S1611, the license issue determination unit 405 stores, in the maintenance start date column 815 in the combined product license information, the value of the date when the license issue request for the PC software was transmitted from the PC 103 in step S1605. In other words, in the case where both the authentication date of the MFP software and the authentication date of the PC software are specified through steps S1609 to S1611, the earlier one of these dates is set as the maintenance start date, and the maintenance end date is set based on that maintenance start date.

In step S1612 in FIG. 16C, the license issue determination unit 405 acquires the date information stored in the release date column 713 in the combined product information acquired in step S1606, that is, information regarding the date when this combined product actually becomes usable to the user.

In step S1613, the license issue determination unit 405 determines whether or not the release date of the combined product acquired in step S1612 is included in the period from the maintenance start date to the maintenance end date that are set as a result of the series of processes from step S1607 to step S1611. If the release date is included in the period from the maintenance start date to the maintenance end date, processing proceeds to step S1614. If not, processing proceeds to step S1617.

In step S1614, the license issue determination unit 405 first collates the value of the license number column 1702 in the license issue request acquired in step S1606 and the value of the combined product license number column 812 in the combined product information. If these values do not coincide, processing proceeds to step S1617. If the values coincide, the license issue determination unit 405 collates the value of the PC product license number column 813 in the combined product information and the value of the license number column 801 in the PC product license information corresponding to the PC content ID column 1701 in the license issue request. If these values coincide, it stores, as the license issue date, the information regarding the date when the license was issued, and stores, in the PC identifier column 804, the value of the PC identifier column 1703 in the license issue request. Then, processing proceeds to step S1615.

In step S1615, the license issue unit 406 in the license management server 102 issues the license file for allowing the corresponding PC software to be operated on the PC 103 that transmitted the license issue request. The license file is binary data.

In step S1616, the transmission unit 402 in the license management server 102 generates a license issue response 1800 to be returned as a response to the license issue request received in step S1606, and transmits it to the reception unit 502.

FIGS. 18A and 18B are diagrams showing data structures of the license issue response issued by the license issue unit 406 in step S1616. In FIG. 18A, the license issue response 1800 is constituted by a processing result section 1801, a license number section 1802, a PC product ID section 1803, a PC product name section 1804, a license data section 1805, a maintenance start date information section 1806, and a maintenance end date information section 1807. The processing result section 1801 is a data section for storing a processing result of license issue processing in steps S1616 and S1617. The value of "Success" is stored therein if processing was successful, and the value of "Failure" is stored therein if processing failed. Specifically, "Success" is stored if the license issue response is generated in step S1616. "Failure" is stored if the license issue response is generated in step S1617, which will be described later. The license number section 1802 is a data section for storing the value of the license number column 1702 in the license issue request. The PC product ID section 1803 is a data section for storing the value of the PC product ID column 701 in the PC software product information corresponding to the PC content ID column 1701 in the license issue request. The PC product name section 1804 is a data section for storing the value of the PC product name column 702 in the PC software product information corresponding to the PC content ID column 1701 in the license issue request. The license data section 1805 is a data section for storing the license file. It stores the license file issued in step S1618. When the license file is stored in the license data section 1805, the binary date is processed into a data format that can be displayed as text, such as BASE64 format, and is then stored. The maintenance start date information section 1806 and the maintenance end date information section 1807 respectively store the maintenance start date and the maintenance end date that are set as a result of the series of processes from step S1607 to step S1614.

A license issue response 1808 in FIG. 18B is a data diagram showing the license issue response generated in step S1617, which will be described later. Only "Failure" is stored in the processing result section 1801.

In step S1617 in FIG. 16C, the transmission unit 402 in the license management server 102 generates the license issue response 1808 that is returned as a response to the license issue request received in step S1606. Also, the transmission unit 402 generates a license issue failure screen 1904 shown in FIG. 24, which will be described later, and transmits it along with the license issue response 1808 to the reception unit 502.

In step S1618, the reception unit 502 in the PC 103 receives the license issue response from the license management server 102.

In step S1619, the license authentication unit 509 first checks the processing result section 1801 in the received license issue response. If the value stored in the processing result section 1801 is "Failure", processing proceeds to step S1621. If the value stored in the processing result section 1801 is "Success", it is determined whether or not the license file is stored in the license data section 1805. If the license file is stored, processing proceeds to step S1620.

In step S1620, the license authentication unit 509 stores values of the license issue response in the PC software information management table 900, via the PC software information management unit 510. Specifically, it stores the value of the PC product ID section 1803 in the PC product ID column 903, the value of the PC product name section 1804 in the product name column 904, the value of the license number section 1802 in the license number column 905, the value of the maintenance start date information section 1806 in the maintenance start date column 906, and the value of the maintenance end date information section 1807 in the maintenance end date column 907.

Then, the license authentication unit 509 changes the value of the license authentication column 902 to "authenticated". Thus, thereafter, it is determined that license authentication has already been performed in step S1102 in the flow for executing the PC software subjected to the license management according to the present embodiment shown in FIG. 11.

Also, the license authentication screen display unit 507 displays a license issue success screen 1900 on the user interface of the PC 103, and ends the series of license issue processing.

If the value stored in the processing result section 1801 is "Failure", in step S1621 the license authentication screen display unit 507 displays the received license issue failure screen 1904 on the user interface of the PC 103, and ends the series of license issue processing.

Figure 19A:
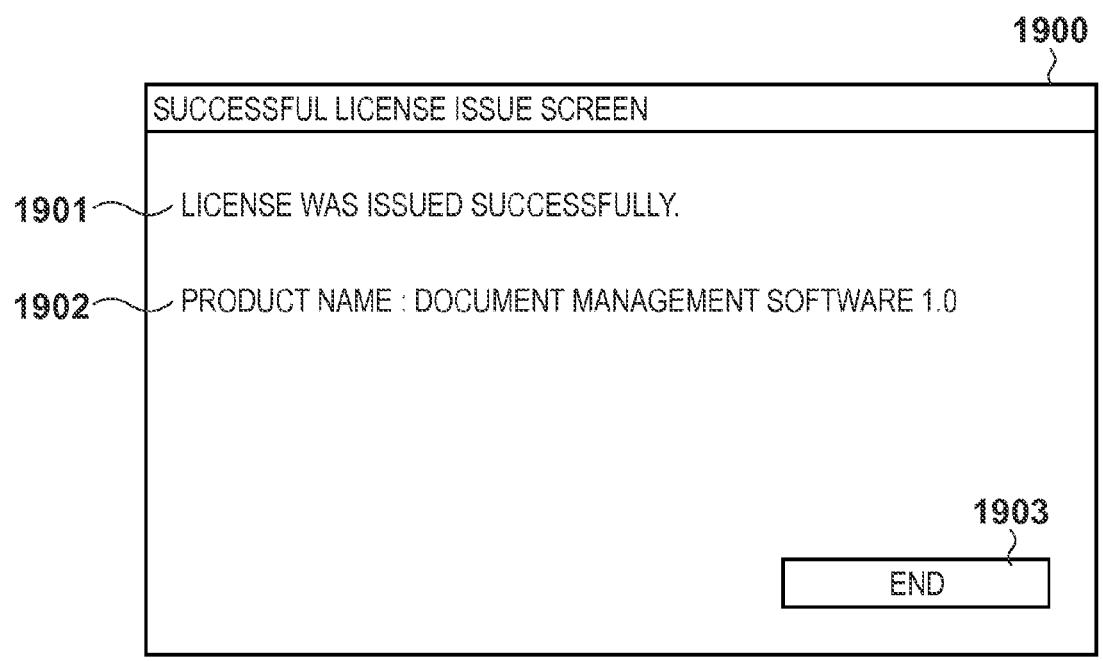
FIGS. 19A and 19B are diagrams showing a license issue end screen.
Figure 19B:
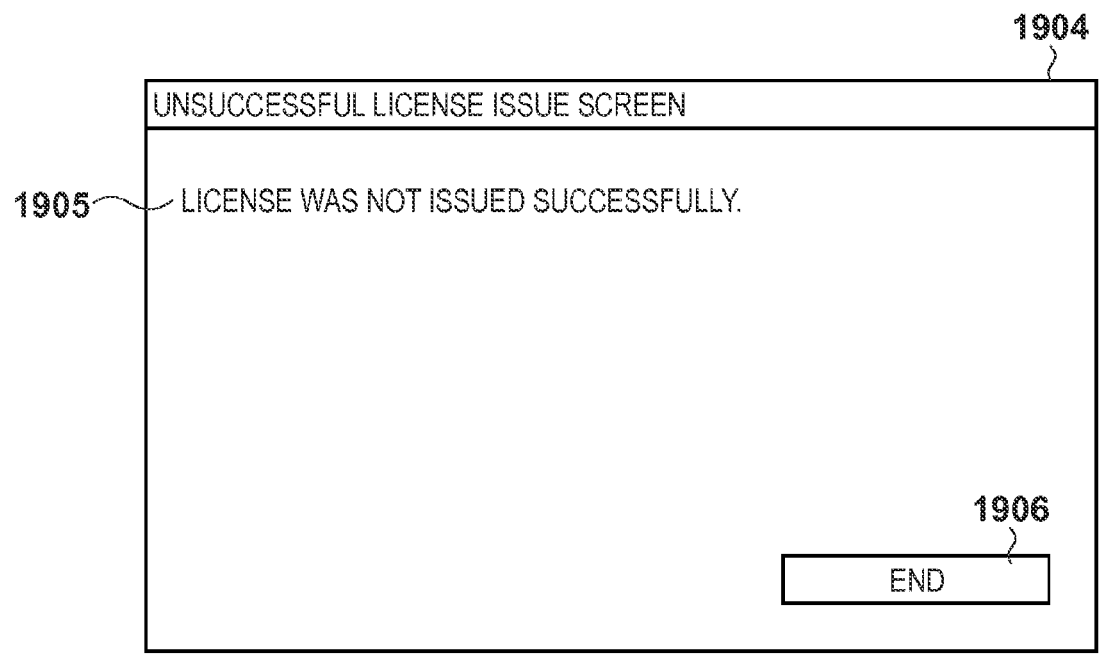

FIGS. 19A and 19B are diagrams showing the license issue end screen displayed by the license authentication screen display unit 507 in steps S1620 and S1621.

There are two types of license issue end screen, namely the license issue success screen 1900 in FIG. 19A and the license issue failure screen 1904 in FIG. 19B. The license issue success screen 1900 is a screen displayed by the license authentication screen display unit 507 in step S1620. The license issue success screen 1900 is constituted by a screen content display label 1901, a product name display label 1902, and an end button 1903. The screen content display label 1901 displays a message for notifying the user that the license was successfully issued. The product name display label 1902 displays a PC software product name for notifying the user of the product name for which the license has been successfully issued. The end button 1903 is a button for finishing the series of license authentication processing. At this time, upon the user pressing the end button 1903, the corresponding PC software starts, for example.

The license issue failure screen 1904 is constituted by a screen content display label 1905 and an end button 1906. The screen content display label 1905 displays a message for notifying the user of the failure of license issue, a reason for the failure, or the like. The end button 1906 is a button for finishing the series of license authentication processing.

With the above-described configurations and procedures, when license authentication is performed for a PC software product included in a combined product provided under a maintenance contract, the authentication date of an MFP software product is acquired from an MFP, and it is checked whether or not there is any MFP software product that was previously installed, thereby enabling appropriate management of the maintenance contract period.

Second Embodiment

It is also conceivable that some combined products have a product configuration in which the included PC software product and MFP software product operate in association with each other. In this case, if, as in the maintenance contract period management described in the first embodiment, the authentication date of the product for which license authentication was first performed among the software products included in the combined product is defined as the maintenance start date, a deviation may occur between the use period and the maintenance contract period.

The present embodiment will describe a license management method in which the maintenance start date is the date when license authentication was performed for all associated software products that are included in a combined product having a configuration in which a PC software product and an MFP software product operate in association with each other.

Note that the description of the present embodiment omits a description of diagrams and flowcharts that are similar to those in the above-described first embodiment.

Figure 20A:
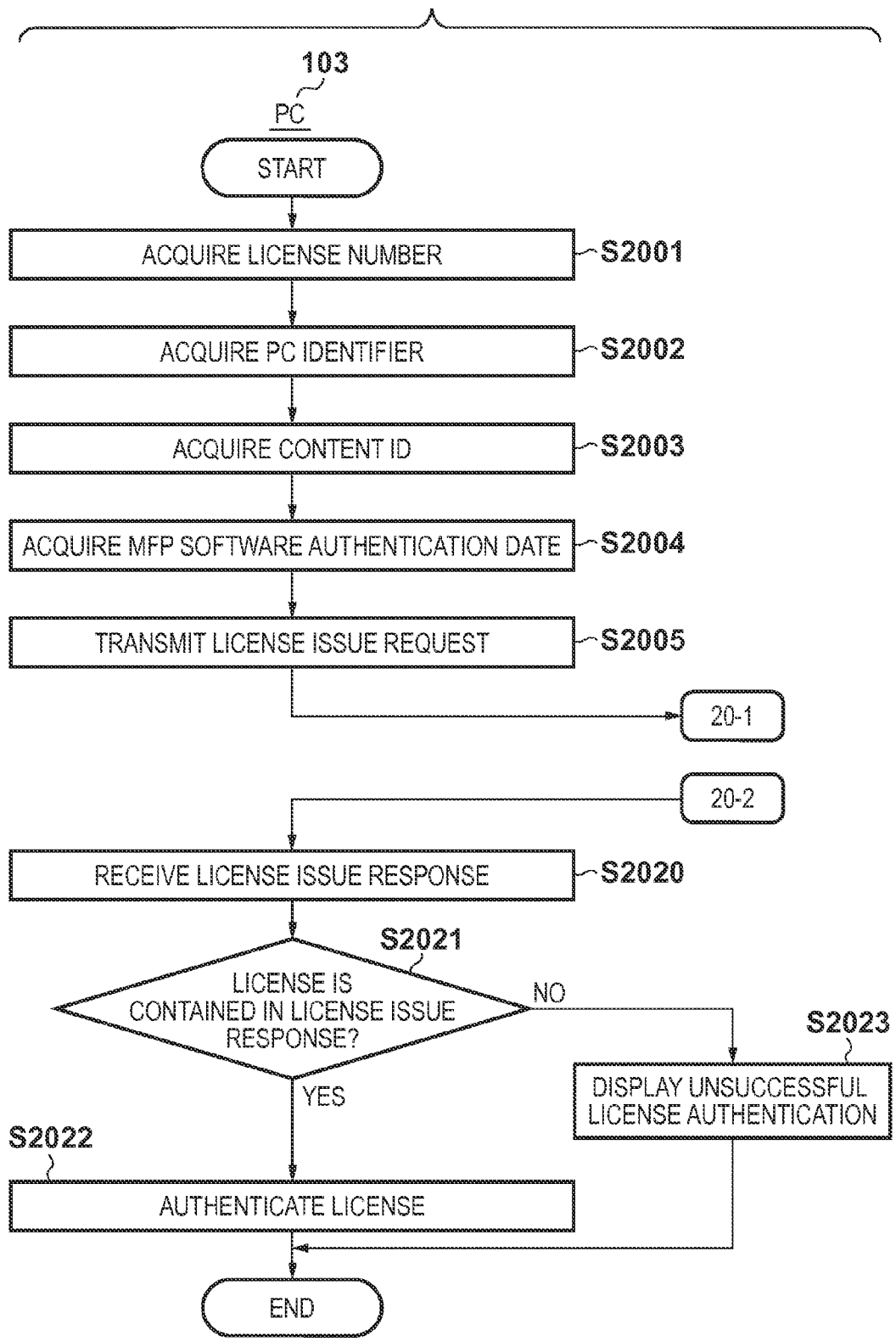
Figure 20C:
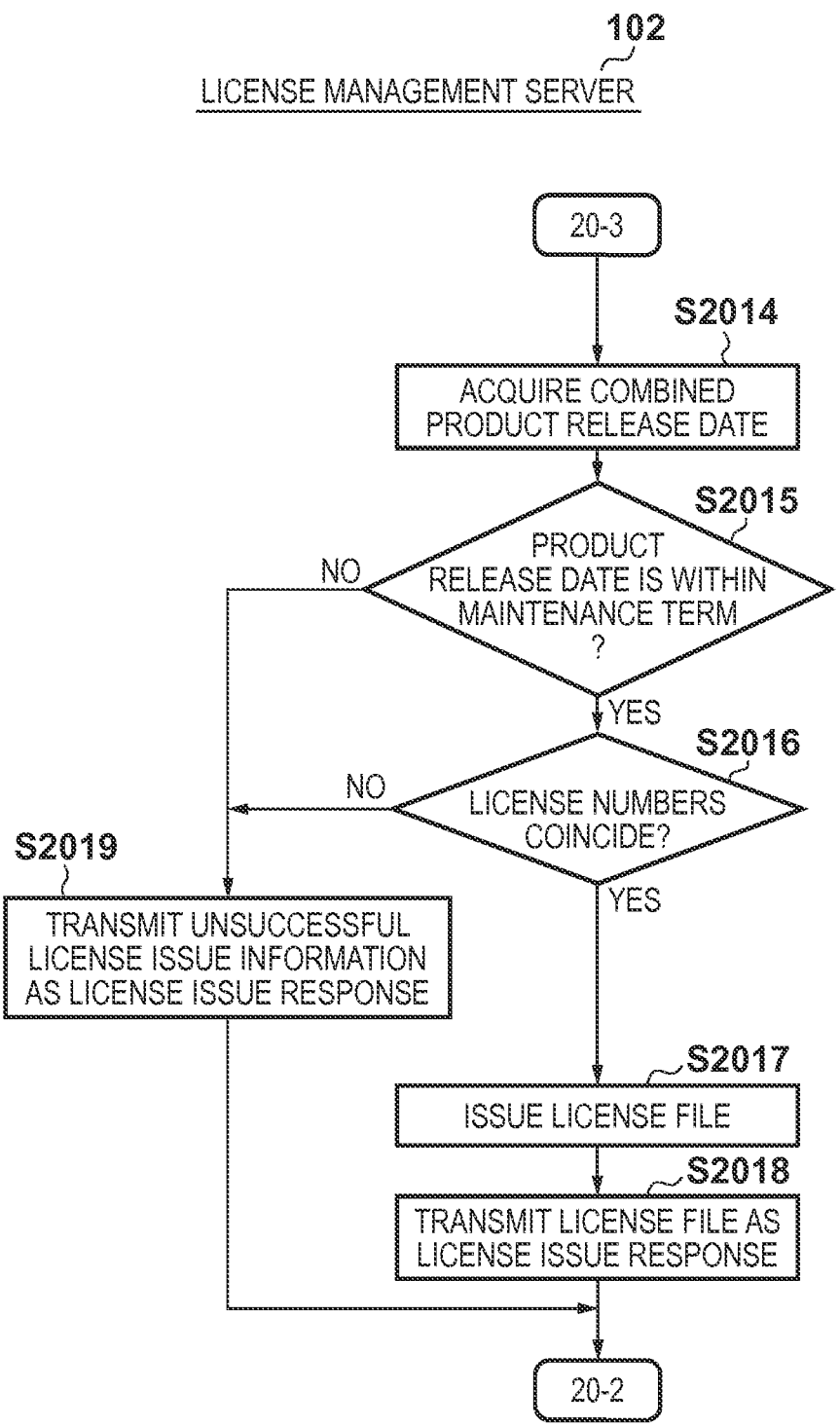

FIGS. 20A to 20C are flowcharts showing a series of operations for authenticating the license of the PC software that is stored in the secondary storage device 206 in the PC 103 and subjected to the license management according to the present invention in the second embodiment.

Processes from steps S2001 to S2005 in FIG. 20A are similar to the processes in steps S1601 to S1605 described in the first embodiment, and the description thereof will be omitted.

In step S2006 in FIG. 20B, the reception unit 401 in the license management server 102 receives the license issue request from the PC 103. Then, the license issue request reception unit 501 delivers the received license issue request to the license issue determination unit 405. The license issue determination unit 405 first acquires the value of the PC content ID column 1701 in the license issue request. Then, the license issue determination unit 405 acquires, via the product information management unit 409, the PC software product information that coincides with the value of the PC content ID column 703 in the PC software product information management table 700. Next, the license issue determination unit 405 acquires the combined product information including an included product ID column 2106 with the PC product ID stored in the PC product ID column 701 in the acquired PC software product information, from a combined product information management table 2100 via the product information management unit 409.

FIG. 21 is a diagram showing a data structure of combined product information managed by the product information management unit 409 in the license management server 102 in the second embodiment, in the form of a table. The combined product information management table 2100 is constituted by a combined product ID column 2101, a combined product name column 2102, a maintenance contract column 2103, a maintenance period column 2104, a release date column 2105, an included product ID column 2106, and a simultaneously-installed product column 2107. Each piece of data of the combined product information management table 2100 is added when the combined product information is registered in the license management server 102.

The columns from the combined product ID column 2101 to the included product ID column 2106 are similar to the columns from the combined product ID column 709 to the included product ID column 714 in FIG. 7C described in the first embodiment, and the description thereof will be omitted.

The simultaneously-installed product column 2107 is a column for storing information that indicates that the PC software and the MFP software included in the combined product operate in association with each other. If the PC software and the MFP software included in the combined product operate in association with each other, "true" is set in the simultaneously-installed product column 2107.

Processes from step S2007 to step S2008 are similar to the processes from step S1607 to step S1608 in FIG. 16B described in the first embodiment, and the description thereof will be omitted.

In step S2009, the license issue determination unit 405 checks the value of the simultaneously-installed product column 2107 in the combined product information acquired in step S2006. If the value of the simultaneously-installed product column 2107 is "true", processing proceeds to step S2010. If the value of the simultaneously-installed product column 2107 is "false", processing proceeds to step S2011.

In step S2010, the license issue determination unit 405 compares the date when the MFP software stored in the MFP software authentication date column 1704 was authenticated with the date when the license issue request for the PC software was transmitted from the PC 103 in step S1605. In this case, since the software package that is the subject of the license is a subject of simultaneous installation, the license issue determination unit 405 stores the value of the later one of the two dates in the maintenance start date column 815 in the combined product license information. Also, the license issue determination unit 405 stores, in the maintenance end date column 816, the value of the maintenance end date that reflects the number of days stored in the maintenance period column 712 in the combined product information acquired in step S2006.

Processes from step S2011 to step S2023 are similar to the processes from step S1609 to step S1621 in FIGS. 16B and 16C described in the first embodiment, and the description thereof will be omitted.

With the above-described procedure, it is possible to set the start date of the maintenance period for a combined product to the time when the product became usable to the user, in the form of provision of a combined product that can be provided only after the PC software and the MFP software are associated with each other. It is thereby possible to manage the license without occurrence of an error between the expiration date for use of the user and the maintenance period for the product.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176375, filed Aug. 8, 2012, which is hereby incorporated by reference herein in its entirety.

What is claimed is:

1. A license management system having a client device and a server system that manages a license of a software package including a plurality of pieces of software that are executed on different devices,
the client device comprising:
a first memory storing program code; and
a first hardware processor that, upon execution of the program code stored in the first memory, performs the functions of
a transmission unit that transmits a request containing an identifier of a first piece of software included in the software package to the server system;
a first reception unit that receives a response containing device identification information from the server system;
a first request unit that makes a request for date information regarding authentication of a second piece of software included in the software package to a device corresponding to the device identification information, if the second piece of software is already authenticated;
a second reception unit that receives a response containing the date information regarding authentication from the device corresponding to the device identification information; and
a second request unit that makes a request to issue a license of the software package, the request containing the date information regarding authentication, to the server system,
the server system comprising:
a second memory storing program code; and
a second hardware processor that, upon execution of the program code stored in the second memory, performs the functions of
a second transmission unit that, in the case of receiving the request containing the identifier of the first piece of software, transmits device identification information regarding a device that executes the second piece of software to the client device;
a third reception unit that receives the request to issue a license for the software package;
a setting unit that sets a start date of a maintenance period of the software package, based on the date information regarding authentication contained in the request to issue a license and a date of the request to issue a license; and
a response unit that makes a response with the license of the software package to the client device if a date when the software package becomes usable is within the maintenance period starting from the start date,
wherein the setting unit further determines whether or not the first piece of software and the second piece of software are subjects of simultaneous installation; sets, as the start date of the maintenance period of the software package, the earlier one of a date of the date information regarding authentication of the second piece of software contained in the request to issue a license and the date of the request to issue a license, if the first piece of software and the second piece of software are not the subjects of simultaneous installation; and sets, as the start date of the maintenance period of the software package, the later one of the date of the date information regarding authentication of the second piece of software contained in the request to issue a license and the date of the request to issue a license, if the first piece of software and the second piece of software are the subjects of simultaneous installation.

2. The license management system according to claim 1, wherein the device that executes the second piece of software is a multi-functional device, and a device that executes the first piece of software is the client device.

3. A license management method performed by a client device and a server system that manages a license of a software package including a plurality of pieces of software that are executed on different devices, comprising:
a transmission step in which the client device transmits a request containing an identifier of a first piece of software included in the software package to the server system;
a second transmission step in which, in the case where the request containing the identifier of the first piece of software is received, the server system transmits device identification information regarding a device that executes a second piece of software to the client device;
a first reception step in which the client device receives a response containing the device identification information from the server system;

a first request step in which the client device makes a request for date information regarding authentication of the second piece of software included in the software package to a device corresponding to the device identification information, if the second piece of software is already authenticated, a second reception step in which the client device receives a response containing the date information regarding authentication from the device corresponding to the device identification information;

a second request step in which the client device makes a request to issue of a license of the software package, the request containing the date information regarding authentication, to the server system;

a third reception step in which the server system receives the request to issue a license of the software package;

a setting step in which the server system sets a start date of a maintenance period of the software package, based on the date information regarding authentication contained in the request to issue a license and a date of the request to issue a license; and a response step in which the server system makes a response with the license of the software package to the client device if a date when the software package becomes usable is within the maintenance period starting from the start date, wherein the setting step further comprises determining whether or not the first piece of software and the second piece of software are subjects of simultaneous installation; setting, as the start date of the maintenance period of the software package, the earlier one of a date of the date information regarding authentication of the second piece of software contained in the request to issue a license and the date of the request to issue a license, if the first piece of software and the second piece of software are not the subjects of simultaneous installation; and setting, as the start date of the maintenance period of the software package, the later one of the date of the date information regarding authentication of the second piece of software contained in the request to issue a license and the date of the request to issue a license, if the first piece of software and the second piece of software are the subjects of simultaneous installation.

* * * * *